(12) United States Patent
Munro et al.

(10) Patent No.: US 12,712,994 B2
(45) Date of Patent: Aug. 18, 2026

(54) ADAPTIVE VIRTUAL CONTENT MAGNIFICATION

(71) Applicant: Apple Inc., Cupertino, CA (US)

(72) Inventors: Colin D. Munro, San Jose, CA (US); Seyedkoosha Mirhosseini, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 18/669,451

(22) Filed: May 20, 2024

(65) Prior Publication Data

US 2024/0406362 A1 Dec. 5, 2024

Related U.S. Application Data

(60) Provisional application No. 63/470,948, filed on Jun. 4, 2023.

(51) Int. Cl.

| | |
|---|---|
| ***H04N 13/128*** | (2018.01) |
| ***G06T 13/20*** | (2011.01) |
| ***H04N 13/20*** | (2018.01) |
| ***H04N 13/275*** | (2018.01) |
| ***H04N 13/366*** | (2018.01) |
| ***H04N 13/398*** | (2018.01) |

(52) U.S. Cl.
CPC ........... *H04N 13/128* (2018.05); *G06T 13/20* (2013.01); *H04N 13/275* (2018.05); *H04N 13/366* (2018.05); *H04N 13/398* (2018.05)

(58) Field of Classification Search
CPC .. H04N 13/128; H04N 13/275; H04N 13/366; H04N 13/398; H04N 13/139; H04N 13/156; G06T 13/20; G06F 2203/04805; G06F 2203/04806; G06F 3/011; G06F 3/012; G06F 3/013; G06F 3/017
See application file for complete search history.

(56) References Cited

U.S. PATENT DOCUMENTS

| | | | | |
|---|---|---|---|---|
| 10,529,063 | B2 * | 1/2020 | Rodriguez | G06F 1/3203 |
| 10,748,259 | B2 * | 8/2020 | Rodriguez | G06T 3/4007 |
| 10,861,242 | B2 * | 12/2020 | Lacey | G06F 3/013 |
| 11,151,699 | B2 * | 10/2021 | Rodriguez | G06T 5/80 |
| 11,561,401 | B2 * | 1/2023 | Mathur | G02F 1/1368 |
| 11,971,542 | B2 * | 4/2024 | Vlaskamp | G02B 27/0172 |
| 12,422,969 | B2 * | 9/2025 | Golden | G06T 19/20 |
| 2019/0362557 | A1 * | 11/2019 | Lacey | G06F 3/017 |
| 2021/0373327 | A1 * | 12/2021 | Vlaskamp | G02B 27/0101 |

* cited by examiner

*Primary Examiner* — Vijay Shankar
(74) *Attorney, Agent, or Firm* — BAKERHOSTETLER

(57) ABSTRACT

Electronic devices such as mixed reality devices may present virtual objects at a display and provide a virtual magnifier to alter (e.g., magnify) the virtual objects. In one or more implementations, the virtual magnifier magnifies a first virtual object and subsequently magnifies a second virtual object. The electronic device may provide one or more effects, such as initially maintaining the current size of the second virtual object and subsequently adjusting the size of the second virtual object based on the first virtual object, including the relative depth between the first virtual object and the second virtual object. In one or more implementations, a process for stabilization of a magnified object is applied in circumstances when the change in position of the electronic device or change in user's gaze location is at or above a threshold.

20 Claims, 14 Drawing Sheets

ADAPTIVE VIRTUAL CONTENT MAGNIFICATION

CROSS-REFERENCE TO RELATED APPLICATION(S)

This application claims the benefit of U.S. Provisional Application No. 63/470,948, entitled "ADAPTIVE VIRTUAL CONTENT MAGNIFICATION," filed Jun. 4, 2023, the entirety of which is incorporated herein by reference.

TECHNICAL FIELD

This application is directed to mixed reality (MR) devices, and more particularly, to managing virtual content that is magnified on a display of an MR device.

BACKGROUND

MR devices, such as virtual reality devices and augmented reality, devices may provide virtual content on a display. As an example application, at least some of the virtual content may be modified, for example, to change the image size of the virtual content. However, in some instances, the display updates (e.g., refresh rate) may distort the resized image. Moreover, in some instances, the image size is increased substantially enough to cause issues such as double vision.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
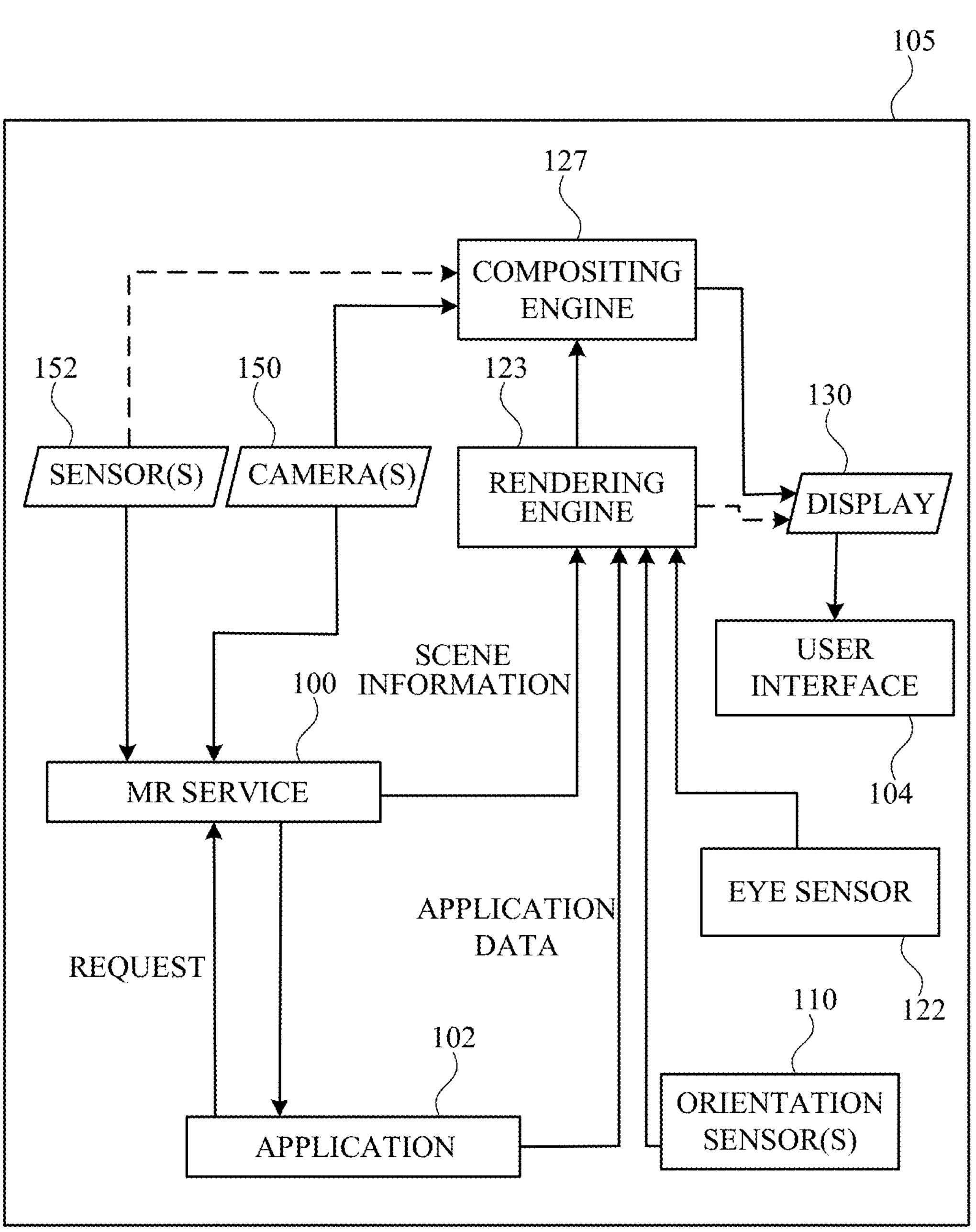
FIG. 1 illustrates an example system architecture of an electronic device implementing the subject system, in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A person can interact with and/or sense a physical environment or physical world without the aid of an electronic device. A physical environment can include physical features, such as a physical object or surface. An example of a physical environment is a physical forest that includes physical plants and animals. A person can directly sense and/or interact with a physical environment through various means, such as hearing, sight, taste, touch, and smell. In contrast, a person can use an electronic device to interact with and/or sense a mixed reality (MR) environment that is wholly or partially simulated. The MR environment can include augmented reality (AR) content, virtual reality (VR) content, and/or the like. With an MR system, some of a person's physical motions, or representations thereof, can be tracked and, in response, characteristics of virtual objects simulated in the MR environment can be adjusted in a manner that complies with at least one law of physics. For instance, the MR system can detect the movement of a user's head and adjust graphical content and auditory content presented to the user similar to how such views and sounds would change in a physical environment. In another example, the MR system can detect movement of an electronic device that presents the MR environment (e.g., a mobile phone, tablet, laptop, or the like) and adjust graphical content and auditory content presented to the user similar to how such views and sounds would change in a physical environment. In some situations, the MR system can adjust characteristic(s) of graphical content in response to other inputs, such as a representation of a physical motion (e.g., a vocal command).

Many different types of electronic systems can enable a user to interact with and/or sense an MR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

In MR systems that have an opaque display or a transparent or translucent display that is controlled to become opaque (e.g., including MR systems that implement a video pass-through electronic device), the user may not have a direct view of some or all of their physical setting when the system/device is in use. In a VR system, the entirety of the user's view is a virtual setting. In a pass-through AR system, the user is reliant on the cameras of the system to provide a video view of the setting.

Implementations of the subject technology described herein provide various features for adjusting virtual content that is magnified by, for example, an MR device based upon the relative virtual depths between the virtual objects. The magnification may include increasing the size of virtual objects or reducing the virtual depth of the virtual objects. Additional implementations of the subject technology described herein provide various features for stabilizing magnified virtual content when, for example, a virtual magnifier is moved to magnify different or updated virtual content, based on tracking a change in a position of an MR device or through gaze tracking.

These and other embodiments are discussed below with reference to FIGS. 1-15. However, those skilled in the art will readily appreciate that the detailed description given herein with respect to these Figures is for explanatory purposes only and should not be construed as limiting.

FIG. 1 illustrates an example system architecture of an electronic device 105 implementing the subject system, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 105 may be smart phone, a tablet device, or a wearable device such as a head mountable portable system, that includes a display system capable of presenting a visualization of an MR environment to a user. The electronic device 105 may be powered with a battery and/or any other power supply. In an example, the electronic device 105 includes a display 130 that provides a stereoscopic presentation of an MR environment, enabling a three-dimensional visual display of a rendering of a particular scene, to the user.

The electronic device 105 may include one or more cameras 150 (e.g., visible light cameras, infrared cameras, etc.) Further, the electronic device 105 may include one or more sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for interacting with virtual content displayed within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

For explanatory purposes, portions of the architecture of FIG. 1 are described as being implemented by the electronic device 105 of FIG. 1, such as by a processor and/or memory of the electronic device. Various portions of the architecture of FIG. 1 can be implemented in software or hardware, including by one or more processors and a memory device containing instructions, which when executed by the processor cause the processor to perform the operations described herein. For example, in FIG. 1, the trapezoidal boxes may indicate that the sensors 152, the one or more cameras 150 and the display 130 may be hardware components, and the rectangular boxes may indicate that the MR service 100, the application 102, the rendering engine 123, and the compositing engine 127 (e.g., compositor) may be implemented in software, including by one or more processors and a memory device containing instructions, which when executed by the processor cause the processor to perform the operations described herein.

In the example of FIG. 1, the application 102 may provide application data to a rendering engine 123 for rendering of the application data, such as for rendering of the UI of the application. The application 102 may be a gaming application, a media player application, a content-editor application, a training application, a simulator application, a social media application, or generally any application that provides a UI or other content for display at a location that depends on the physical environment, such as by anchoring the UI or other content to an anchor in the physical environment. The application data may include application-generated content (e.g., windows, buttons, tools, characters, images, videos, etc.) and/or user-generated content (e.g., text, images, etc.), and information for rendering the content in the UI. In one or more implementations, the rendering engine 123 renders the UI 104 for display by a display such as display 130 of the electronic device 105. In one or more implementations, the MR service 100 may assign a portion of a physical environment of the electronic device to the application 102 (e.g., while the application 102 is running on the electronic device 105 and while the UI 104 is displayed by the display 130.

As shown in FIG. 1, additional information may be provided for display of the UI of the application 102, such as in a two-dimensional or three-dimensional (e.g., MR) scene. In the example of FIG. 1, the one or more sensors 152 may provide physical environment information (e.g., depth information from one or more depth sensors, motion information from one or more motion sensors), and/or user information to an MR service 100. The one or more cameras 150 may also provide images of a physical environment and/or one or more portions of the user (e.g., the user's eyes, hands, face, etc.) to the MR service 100. The MR service 100 may generate scene information, such as a three-dimensional map, of some or all of the physical environment of electronic device 105 using the environment information (e.g., the depth information and/or the images) from the one or more sensors 152 and the one or more cameras 150. The MR service 100 may also determine a gaze location based on images and/or other sensor data representing the position and/or orientation of the user's eye(s). The MR service 100 may also identify a gesture (e.g., a hand gesture) performed by a user of the electronic device 105, based on images and/or other sensor data representing the position and/or orientation of the user's hand(s) and/or arm(s).

As illustrated in FIG. 1, in one or more implementations, the application 102 may provide a request to the MR service 100. For example, the request may be a request for scene information (e.g., information describing the content of the physical environment), and/or a request for user information such as a request for a gaze location and/or user gesture information. In one example, the request may be an anchor request for a physical anchor (e.g., a horizontal surface, a vertical surface, a floor, a table, a wall, etc.).

The application 102 may include code that, when executed by one or more processors of electronic device 105, generates application data, for display of the UI 104 on, near, attached to, or otherwise associated with an anchor location corresponding to the anchor identified by the identifier provided from MR service 100. The application 102 may include code that, when executed by one or more processors of the electronic device 105, modifies and/or updates the application data based on user information (e.g., a gaze location and/or a gesture input) provided by the MR service 100.

Once the application data has been generated, the application data can be provided to the MR service 100 and/or the rendering engine 123, as illustrated in FIG. 1. As shown, scene information can also be provided to rendering engine 123. The scene information provided from the MR service 100 to the rendering engine 123 can include or be based on, as examples, environment information such as a depth map of the physical environment, and/or object information for detected objects in the physical environment. The rendering engine 123 can then render the application data from the application 102 for display by the display 130 of electronic device 105 to appear at a desired location in a physical environment. For example, a representation of the UI 104 may be rendered for display at the appropriate location on the display 130, to appear to be located at a desired location in the physical environment, using the application data and using the scene information from the MR service 100 (which may include scene information for other portions of the physical environment).

In one or more implementations, the display 130 may be, for example, an opaque display, and the one or more cameras 150 may be configured to provide a pass-through video feed to the opaque display. The UI 104 may be rendered for display at a location on the display corresponding to the displayed location of a physical anchor object in the pass-through video. The display 130 may be, as another example, a transparent or translucent display. The UI 104 may be rendered for display at a location on the display corresponding to a direct view, through the transparent or translucent display, of the physical environment.

As shown, in one or more implementations, the electronic device 105 may further include a compositing engine 127 that composites video images of the physical environment, based on images from one or more cameras 150, for display together with the UI 104 from the rendering engine 123. For example, the compositing engine 127 may be provided in the electronic device 105 and when the display 130 includes an opaque display, the compositing engine 127 may provide pass-through video to the display. In several examples shown and described herein, the compositing engine 127 may modify the virtual depth a virtual object by adjusting the disparity between the virtual object displayed to each eye of a user of the electronic device 105, such as in a stereoscopic display mode. In one or more implementations, this may include adjusting the disparity to adjust the virtual depth of one virtual object relative to another virtual object.

Although the example of FIG. 1 illustrates the rendering engine 123 as being separate from the MR service 100, it should be appreciated that the MR service 100 and the rendering engine 123 may form a common service and/or that rendering operations for rendering content for display can be performed by the MR service 100. Although the example of FIG. 1 illustrates the rendering engine 123 as being separate from application 102, it should be appreciated that, in some implementations, the application 102 may render content for display by the display 130 without using a separate rendering engine. Although the application 102 is depicted as a single application in FIG. 1, it is appreciated that the application 102 may represent multiple applications running concurrently on the electronic device 105 and generating application data for rendering of respective UIs for display by display 130. In one or more implementations, the compositing engine 127 may composite application data for multiple UIs of multiple applications for concurrent display.

The electronic device 105 may include one or more orientation sensors 110 for detecting orientation and/or movement of the electronic device 105 and/or the one or more displays 130. For example, the electronic device 105 may the use one or more orientation sensors 110 to track changes in the position and/or orientation of the electronic device 105 and/or the one or more displays 130, such as with respect to physical elements in the physical setting. The one or more orientation sensors 110 optionally include one or more gyroscopes and/or one or more accelerometers. Additionally, the electronic device 105 may further include an eye sensor 122 that track the gaze location of each of the user's eyes and/or the location at which the gaze directions of the user's eye converge (e.g., at a gaze plane).

Figure 2A:
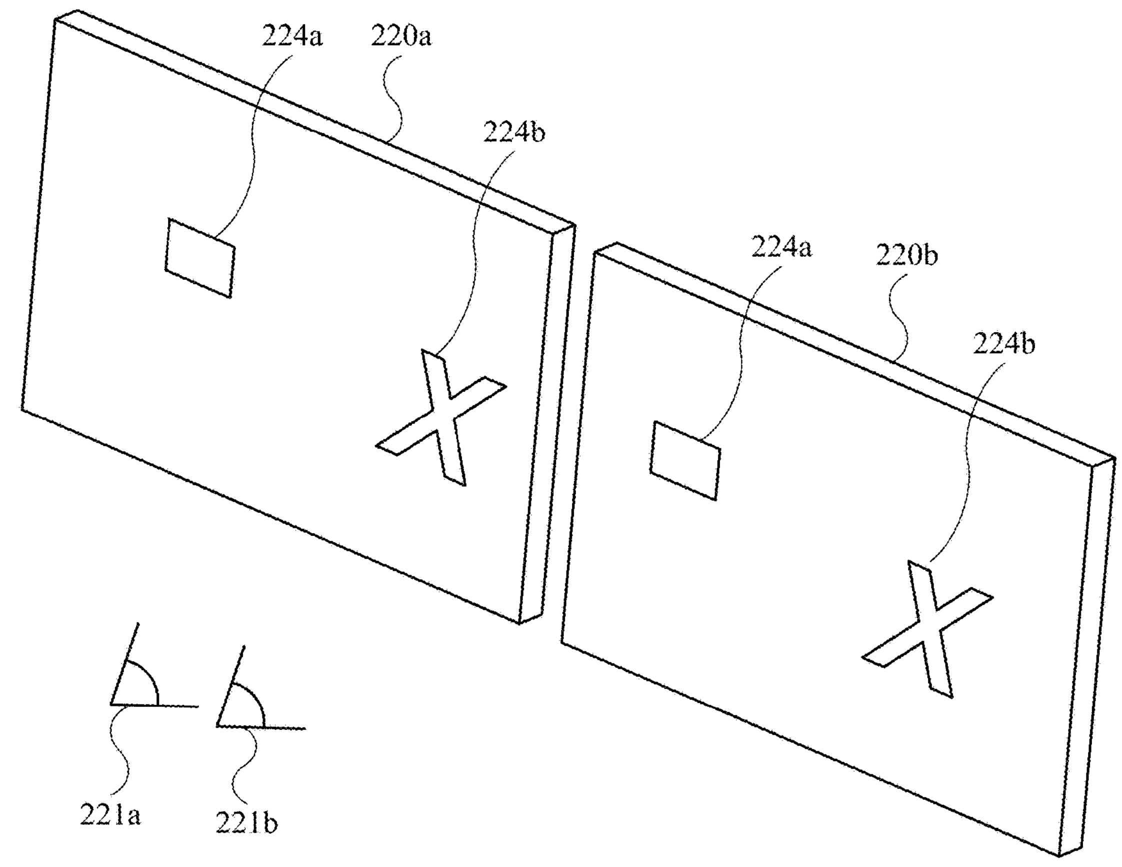
FIG. 2A and FIG. 2B illustrate a perspective view and a plan view, respectively, of an example of displays of an electronic device presenting virtual content, in accordance with one or more implementations.

FIG. 2A illustrates a display 220*a* and a display 220*b*, with each of the display 220*a* and 220*b* presenting a virtual content to a left eye 221*a* and a right eye 221*b*, respectively, of a user. The displays 220*a* and 220*b* may include any features and functions described for the display 130 (shown in FIG. 1). Accordingly, the displays 220*a* and 220*b* may present virtual content in a stereoscopic display mode. Also, the displays 220*a* and 220*b* may be integrated with an electronic device (not shown), which may take the form of an MR device (as a non-limiting example) in which a user views content as virtual content by the displays 220*a* and 220*b*. In one or more implementations, the displays 220*a* and 220*b* are integrated with a MR device in which a user views all content as virtual content on the displays 220*a* and 220*b*. However, in one or more implementations, the displays 220*a* and 220*b* are integrated with an AR device, or pass-through system, in which the user may see at least some real world objects through a lens, and each of the displays 220*a* and 220*b* projects the virtual objects onto the lens, thus superimposing the virtual objects over the real world objects.

As shown, the display 220*a* presents a virtual object 224*a* and a virtual object 224*b*, while the display 220*b* also presents the virtual object 224*a* and a virtual object 224*b*. The virtual object 224*a* may take the form of a cuboid (three-dimensional rectangle) and the virtual object 224*b* may take the form of a letter (e.g., "X" in three dimensions). While the virtual objects 224*a* and 224*b* are shown as being the same object in terms of size and shape, the virtual objects 224*a* and 224*b* may be presented differently, in terms of position, by the displays 220*a* and 220*b* to account for a disparity (e.g., binocular disparity) between the user's left and right eyes. Also, the virtual objects 224*a* and 224*b* may be generated by a rendering engine (e.g., rendering engine 123 shown in FIG. 1) and/or by a compositor (e.g., compositing engine 127 shown in FIG. 1).

Figure 2B:
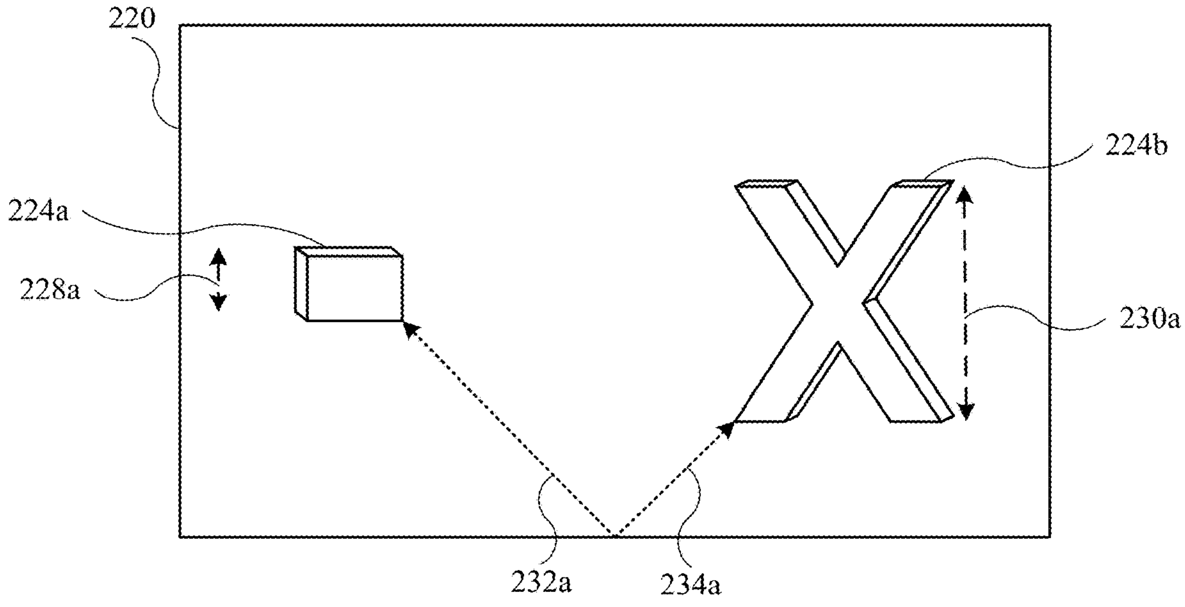

FIG. 2B illustrates a representation 220 that combines the displays 220*a* and 220*b* (shown in FIG. 2A) to present a general representation of the virtual objects 224*a* and 224*b* as seen by the left eye 221*a* and the right eye 221*b* (shown in FIG. 2A) of the user. Several comparisons between the virtual objects 224*a* and 224*b* are shown. For example, the virtual object 224*a* includes a dimension 228*a* and the virtual object 224*b* includes a dimension 230*a*. The dimension 228*a* and the dimension 230*a* may represent a height of the virtual object 224*a* and a height of the virtual object 224*b*, respectively. For purposes of comparison, the dimension 228*a* and the dimension 230*a* may represent a respective general size of the virtual object 224*a* and the virtual object 224*b*.

Additionally, the virtual object 224*a* includes a virtual depth 232*a* and the virtual object 224*b* includes a virtual depth 234*a*, as presented at the representation 220. A virtual depth may refer to a virtual distance between a user (e.g., a user of the electronic device with the representation 220) and a virtual object. As shown, the virtual depth 232*a* of the virtual object 224*a* is different from the virtual depth 234*a* of the virtual object 224*a*. For example, the virtual depth 232*a* of the virtual object 224*a* is greater than the virtual depth 234*a* of the virtual object 224*b*. In this regard, the virtual object 224*a* may be rendered at the representation 220 as appearing farther away from a user than the virtual object 224*b*. Based on the difference in the virtual depths 232*a* and 234*a*, the virtual object 224*a* may appear smaller than the virtual object 224*b*. However, the dimension 228*a* of the virtual object 224*a* may be the same as or greater than the dimension 230*a* of the virtual object 224*b*, but may appear smaller due the difference between the virtual depths 232*a* and 234*a* (e.g., the virtual depth 232*a* being greater than the virtual depth 234*a*). Alternatively, the dimension 228*a* of the virtual object 224*a* may be less than the dimension 230*a* of the virtual object 224*b*.

Figure 3A:
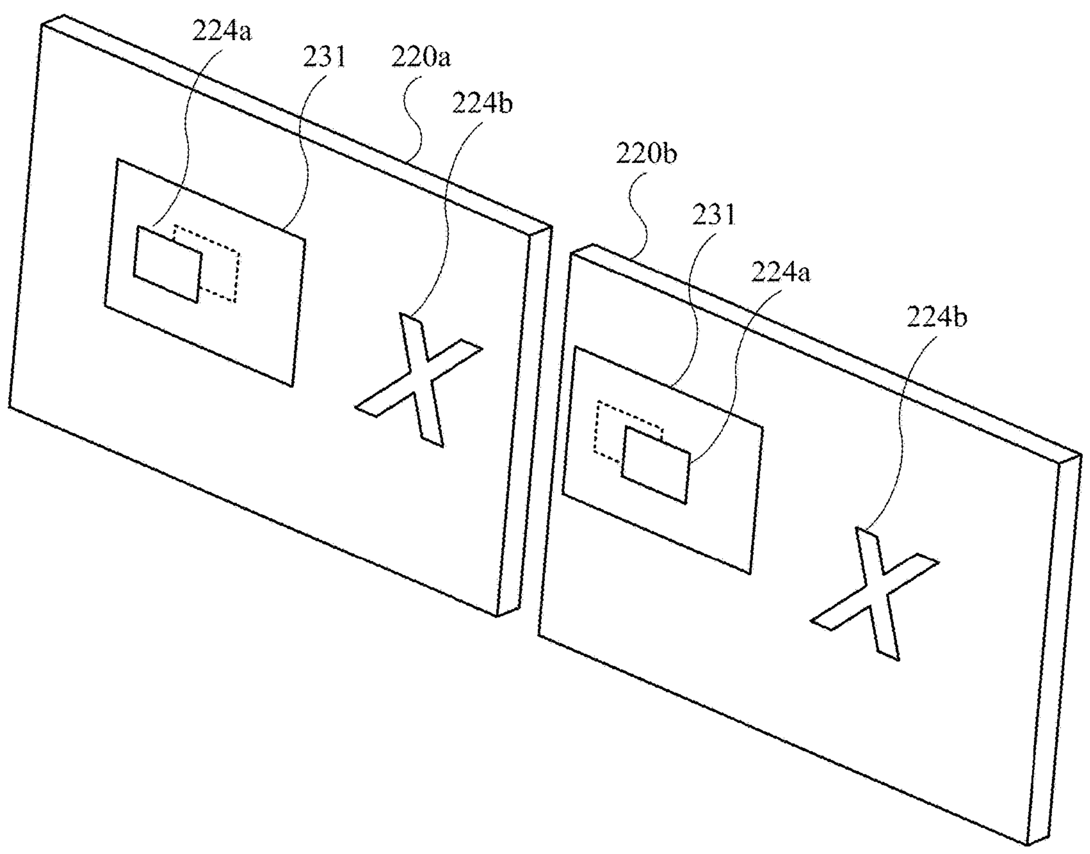
FIG. 3A and FIG. 3B illustrate a perspective view and a plan view, respectively, of an example of displays of an electronic device presenting virtual content, further showing a virtual magnifier over a virtual object, in accordance with one or more implementations.

FIG. 3A illustrates a virtual magnifier 231 rendered by the displays 220*a* and 220*b*. The virtual magnifier 231 may be generated by a rendering engine (e.g., rendering engine 123 shown in FIG. 1) and/or by a compositor (e.g., compositing engine 127 shown in FIG. 1). The compositor may composite (e.g., combine) the virtual objects 224*a* and 224*b* and the virtual magnifier 231 with a video stream (if any) to generate a composite output that is displayed to the user by the displays 220*a* and 220*b*. While the virtual magnifier 231 may be a virtual object itself, the visual effect and/or manipulation shown and described for the virtual magnifier 231 (and other virtual magnifiers shown or described herein) may be performed by a compositor (e.g., compositing engine 127 shown in FIG. 1), and subsequently used to alter the virtual objects 224*a* and 224*b*. For example, as shown in FIG. 3A, when the virtual magnifier 231 is presented by the displays 220*a* and 220*b* as being superimposed over the virtual object 224*a*, the compositor may cause magnification of the virtual object 224*a*, thus allowing the virtual magnifier 231 to mimic the function of a magnifying object (e.g., eyeglasses, magnifying glass). In one or more implementations, the disparity (e.g., distance) between the virtual objects in the left and right eye view may be inversely proportional to the perceived depth of the virtual object from the user.

In order to perform the magnification, the compositor may alter the size of a virtual object by, for example, by causing the display 220*a* to move the virtual object 224*a* relative to the virtual object 224*b* presented by the display 220*b*. For comparative purposes, the virtual object 224*a* in the prior position (shown in FIG. 2A) is shown as dotted lines to show the relative movement of the virtual object 224*a*. Further, each of the displays 220*a* and 220*b* maintain the virtual object 224*b* in the same position, thus the virtual object 224*a* is moved relative to the virtual object 224*b*. Additionally, the compositor may cause the display 220*a* to move the virtual object 224*b* relative to the virtual object 224*a* presented by the display 220*b*. It will be appreciated that reference to the virtual magnifier 231 causing magnification may actually be performed by the compositor.

Figure 3B:
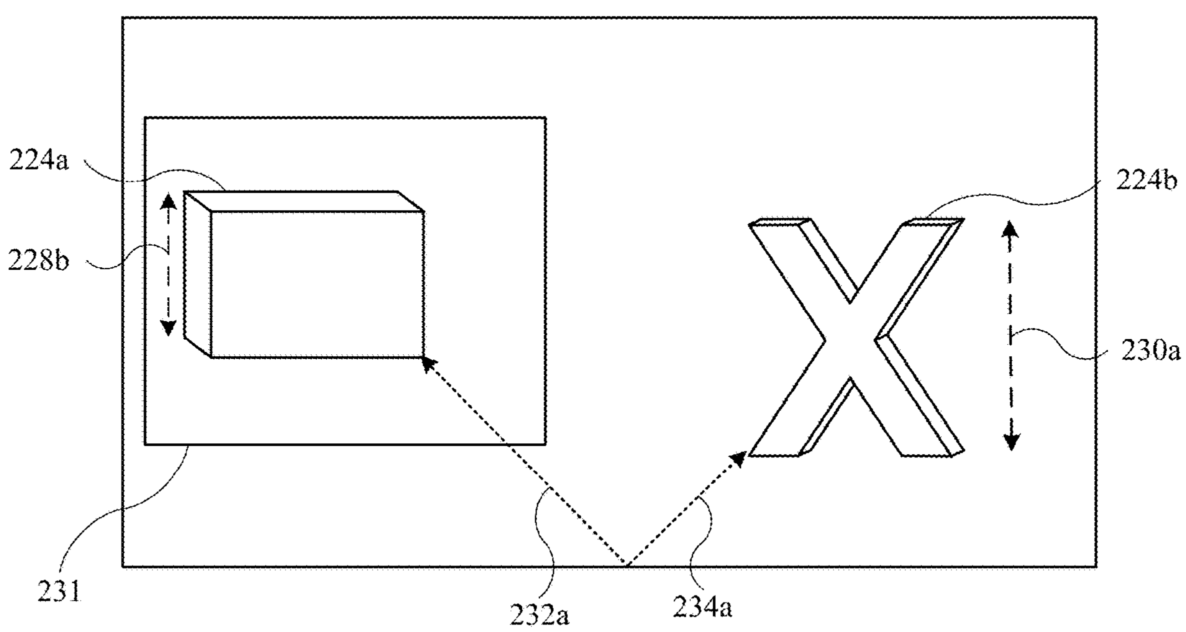

FIG. 3B illustrates the virtual magnifier 231 positioned over the virtual object 224*a* and the virtual object 224*b*. As shown, the virtual object 224*a* increases to a dimension 228*b*, which is greater than a dimension 228*a* (shown in FIG. 2B) of the virtual object 224*a*. The increased dimension (e.g., dimension 228*b*) represents a proportional increase in the size of the virtual object 224*a*. Also, the increase may be based on a magnification factor (e.g., 1.5×, 2×, 5×, etc.) assigned to the virtual magnifier 231. For example, if the magnification factor of the virtual magnifier 231 is set to 2×, the dimension 228*b* of the virtual object 224*a* may represent an increase of the dimension 228*a* (shown in FIG. 2B) by a factor of 2, and accordingly, an increase in the size of the virtual object 224*a* by a factor of 2. Based on the virtual nature of the virtual magnifier 231, the magnification factor of the virtual magnifier 231 may be an adjustable magnification factor.

Based on the virtual magnifier 231 being positioned over the virtual object 224*a* and not positioned over the virtual object 224*b*, the size of the virtual object 224*a* may increase relative to that of the virtual object 224*b*, as the virtual object 224*b* remains at the dimension 230*a*. However, the virtual object 224*a* may remain at the virtual depth 232*a*, as viewed through the virtual magnifier 231, and thus may still appear to be further away as compared to the virtual object 224*b*, based on the virtual depth 234*a* of the virtual object 224*b* being less than the virtual depth 232*a* of the virtual object 224*a* after magnification. Thus, in one or more implementations, the respective virtual depths of the virtual objects 224*a* and 224*b* may be maintained by the virtual magnifier 231 despite the size increase of the virtual object 224*a*.

Accordingly, by moving the virtual object 224*a* relative to the virtual object 224*b*, the virtual object 224*b* may appear differently (e.g., larger). While not depicted, the displays 220*a* and 220*b* may move the virtual object 224*a* relative to the virtual object 224*b* to move the virtual object 224*a* closer to the user (e.g., cause a reduction in the virtual depth 232*a*).

Figure 4A:
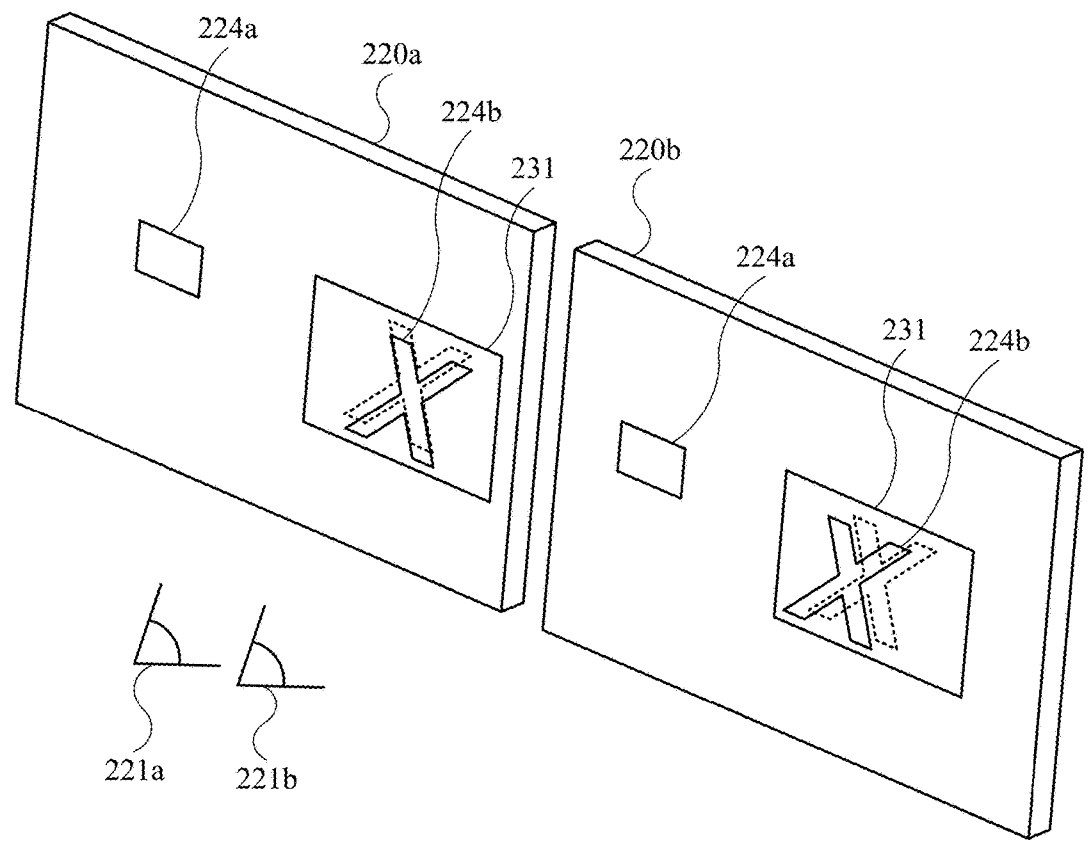
FIG. 4A and FIG. 4B illustrate a perspective view and a plan view, respectively, of an example of displays of an electronic device presenting virtual content, showing a virtual magnifier moved from a first virtual object to a second virtual object and magnifying the second virtual object, in accordance with one or more implementations.

FIG. 4A illustrates the displays 220*a* and 220*b* moving the virtual magnifier 231 from the virtual object 224*a* to the virtual object 224*b*. As shown, the virtual object 224*b* is presented on the displays 220*a* and 220*b* as being moved closer together. For comparative purposes, the virtual object 224*b* in the prior position (shown in FIG. 3A) is shown as dotted lines to show the relative movement of the virtual object 224*b*. While the virtual magnifier 231 increased the size of the virtual object 224*a* in real time, or near real time, after the virtual magnifier 231 is placed over the virtual object 224*a* (as shown in FIGS. 3A and 3B), the same or similar immediate effect may not occur when the virtual magnifier 231 is positioned over the virtual object 224*b*. Rather, the appearance of the virtual object 224*b*, as perceived by the left eye 221*a* and the right eye 221*b*, may be adjusted based on one or more characteristics of the virtual object 224*a*, as discussed below.

Figure 4B:
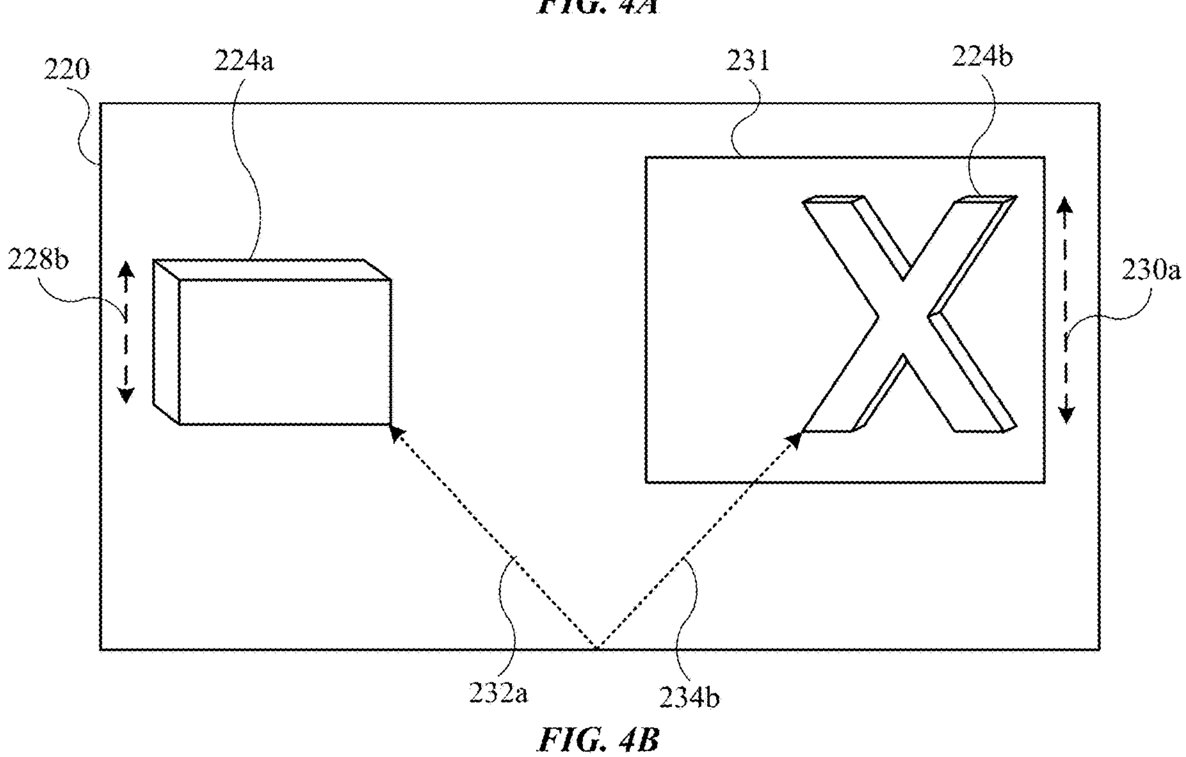

FIG. 4B illustrates the virtual object 224*b* transitioning from the virtual depth 234*a* (e.g., the original virtual depth) to a virtual depth 234*b*. As shown, the virtual depth 234*b* is equal to, or substantially equal to, the virtual depth 232*a*. Thus, the virtual depth 234*b* of the virtual object 224*b* is set based on matching the virtual depth 232*a* of the virtual object 224*a*. However, the dimension 230*a* (e.g., original dimension) of the virtual object 224*b* may remain unchanged. The described effect of altering the virtual object 224*b* to the virtual depth 234*b* may last momentarily. For example, the described effect of transitioning the virtual object 224*b* to the virtual depth 234*b* may last for a predetermined time (e.g., a fraction of a second, a second, a few seconds, etc.).

Figure 5A:
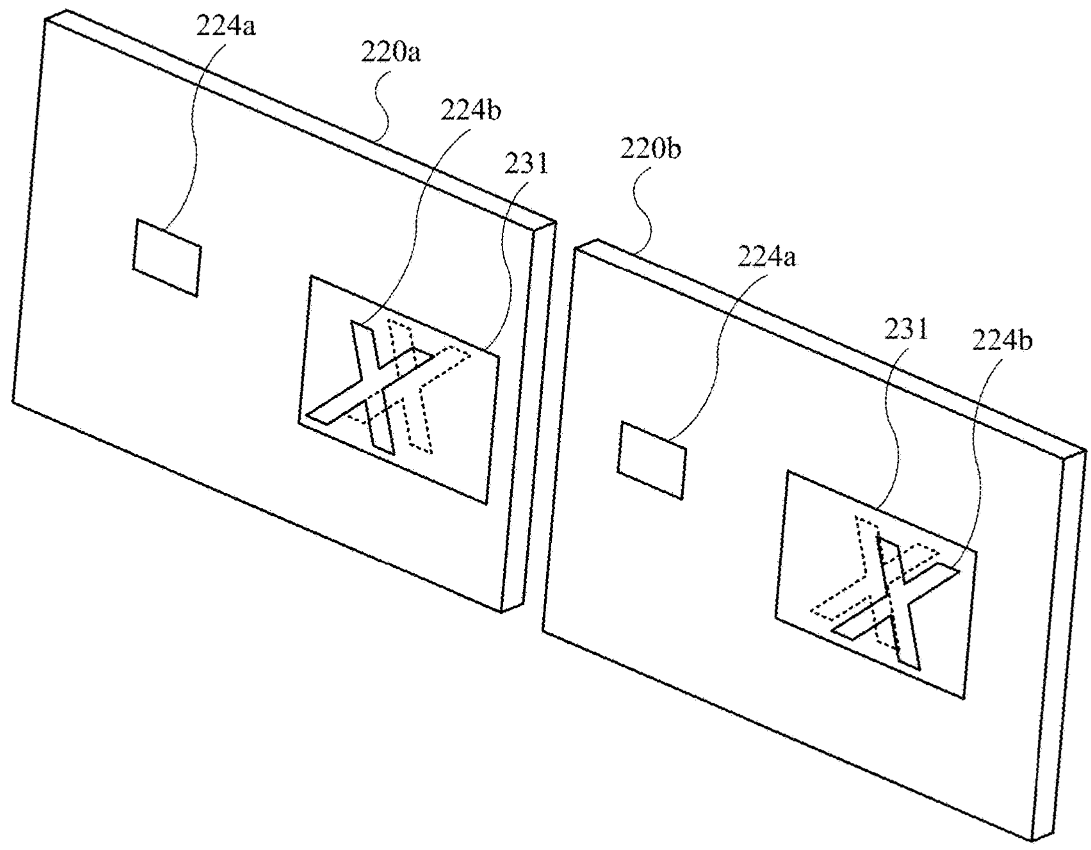
FIG. 5A and FIG. 5B illustrate a perspective view and a plan view, respectively, of an example of displays of an electronic device presenting virtual content, showing a virtual magnifier further magnifying the second virtual object based on one or more aspects of the first virtual object, in accordance with one or more implementations.

FIG. 5A illustrates the displays 220*a* and 220*b* moving the virtual object 224*b*. As shown, the displays 220*a* and 220*b* present the virtual object 224*b* further from each other. For comparative purposes, the virtual object 224*b* in the prior position (shown in FIG. 4A) as dotted lines to show the relative movement of the virtual object 224*b*. The relative movement of the virtual object 224*b* may also include relative movement with respect to the virtual object 224*a*.

Figure 5B:
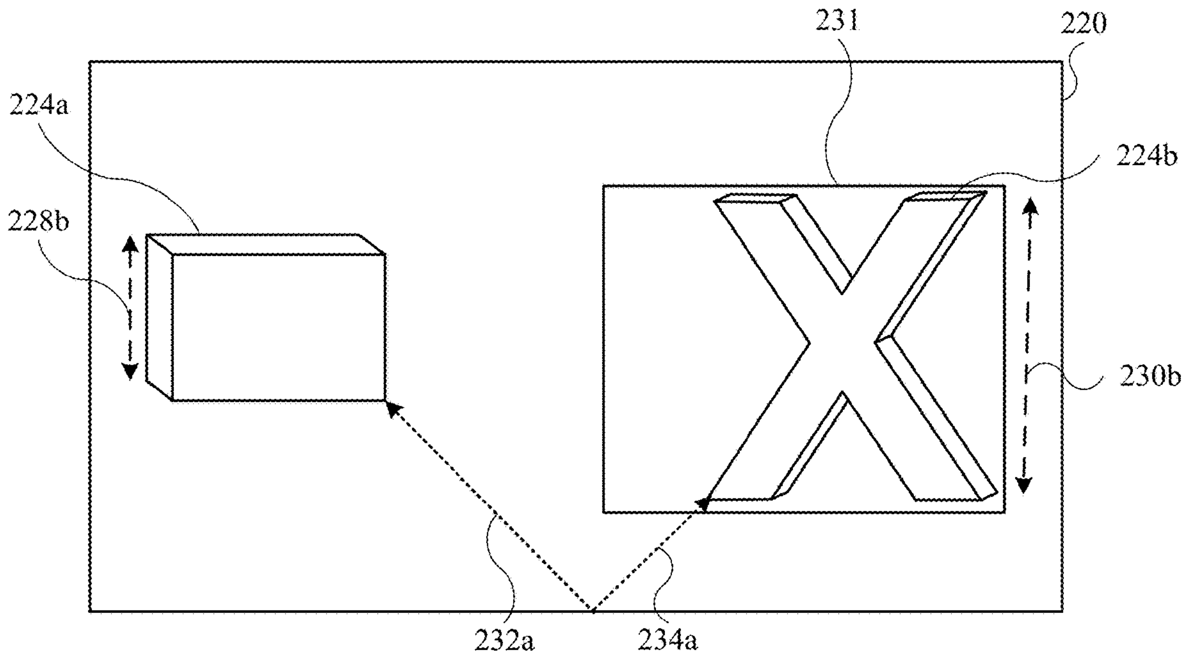

FIG. 5B illustrates the size of the virtual object 224 *b* increasing due to the movement of the virtual object 224 *b* (shown in FIG. 5A). As shown, the virtual object 224 *b* may be animated and increased to a dimension 230 *b* (thus representing a size increase of the virtual object 224 *b*), which is greater than the dimension 230 *a* (e.g., the original dimension shown in FIG. 4). The representation 220 may present the dimensional increase of the virtual object 224 *b* subsequent to passing of the predetermined time in which the virtual object 224 *b* was adjusted to the virtual depth 234 *b* (shown in FIG. 4B). The dimensional increase of the virtual object 224 *b* may be based on the same magnification factor as used to increase the size of the virtual object 224 *a* (shown in FIG. 3). Accordingly, in this example, the virtual object 224 *a* and the virtual object 224 *b* may increase in size by a factor of 2×. Additionally, the virtual object 224 *b*, when increased to the dimension 230 *b*, may again be positioned at the virtual depth 234 *a*. Thus, the magnification of the virtual object 224 *b* may be animated to restore respective proportions in the virtual depths of the virtual objects 224 *a* and 224 *b*. In one or more implementations, the resultant virtual depths may differ than from what is shown in FIG. 5B. However, the respective virtual depths of the virtual objects 224 *a* and 224 *b* between the non-magnified versions of the virtual objects 224 *a* and 224 *b* (e.g., shown in FIG. 2B) may nonetheless be maintained between the magnified versions of the virtual objects 224 *a* and 224 *b* (shown in FIG. 5B). The dimension 228 *b* (e.g., increased dimension) of the virtual object 224 *a* is shown in FIG. 5B for comparative purposes, and the virtual object 224 *a* may reduce back to its original size (e.g., shown in FIG. 2B) based on the virtual magnifier 231 moving away from the virtual object 224 *a*.

By adjusting the virtual depth of the virtual object 224*b* to be equal, or substantially equal, to the virtual depth of the virtual object 224*a* (as shown in FIG. 4B) for a predetermined time and subsequently increasing the size of the virtual object 224*b* (as shown in FIG. 5B), the effect of the virtual magnifier 231 may simulate a user's focus as the user's gaze moves from one virtual object to another virtual object, particularly when virtual objects are of different sizes and/or depths (e.g., from the virtual object 224*a* to the virtual object 224*b*). Beneficially, electronic devices incorporating the features shown and described for altering (e.g., magnifying) the virtual objects 224*a* and 224*b* may provide a more pleasing effect to users as the change in magnification when moving between virtual objects is less sudden.

Figure 6A:
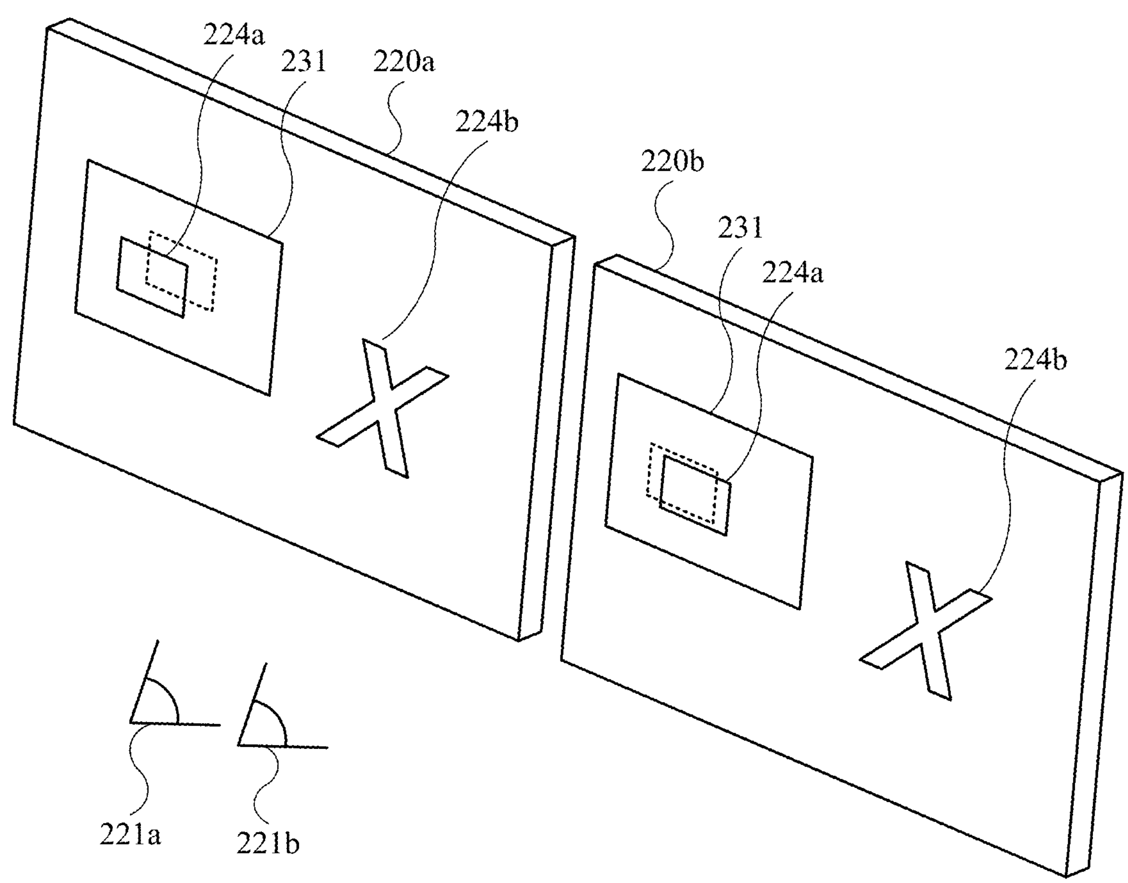
FIG. 6A and FIG. 6B illustrate a perspective view and a plan view, respectively, of an example of displays of an electronic device presenting virtual content, showing a virtual magnifier moved from the second virtual object to the first virtual object to magnify the first virtual object, in accordance with one or more implementations.

FIG. 6A illustrates the displays 220*a* and 220*b* moving the virtual magnifier 231 from the virtual object 224*b* back to the virtual object 224*a*. Further, the displays 220*a* and 220*b* present the virtual object 224*a* further from each other. For comparative purposes, the virtual object 224*a* in the prior position (shown in FIG. 5A) is shown as dotted lines to show the relative movement of the virtual object 224*a*.

Figure 6B:
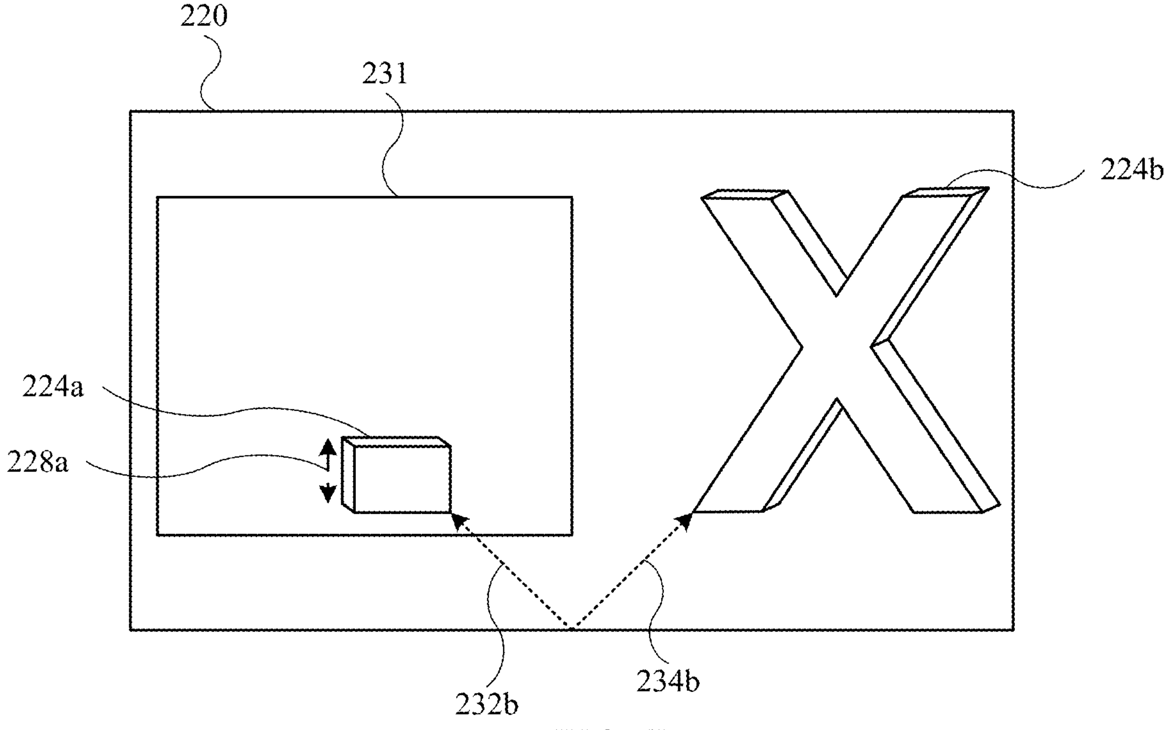

FIG. 6B illustrates the virtual object 224*a* transitioning from the virtual depth 234*a* (e.g., the original virtual depth) to a virtual depth 232*b*. Similar to the prior example, a predetermined time may occur in which the virtual object 224*a* is not immediately magnified by increasing the dimensions of the virtual object 224*a*. Rather, the position or location of the virtual object 224*a*, as perceived by the left eye 221*a* and the right eye 221*b* (shown in FIG. 6A), may be adjusted based on one or more characteristics of the virtual object 224*b*. For example, the virtual object 224*a* may transition from the virtual depth 232*a* (e.g., the original virtual depth) to a virtual depth 232*b*. As shown, the virtual depth 232*b* is the equal, or substantially equal, to the virtual depth 234*b*. Thus, the virtual depth 232*b* of the virtual object 224*a* is set based on matching the virtual depth 234*b* of the virtual object 224*b*. However, the dimension 228*a* (e.g., original dimension) of the virtual object 224*b* may remain unchanged. Similar to a prior example, the described effect of altering the virtual object 224*a* to the virtual depth 232*b* may last momentarily. In this regard, the described effect of transitioning the virtual object 224*a* to the virtual depth 232*b* may last for a predetermined time.

Figure 7A:
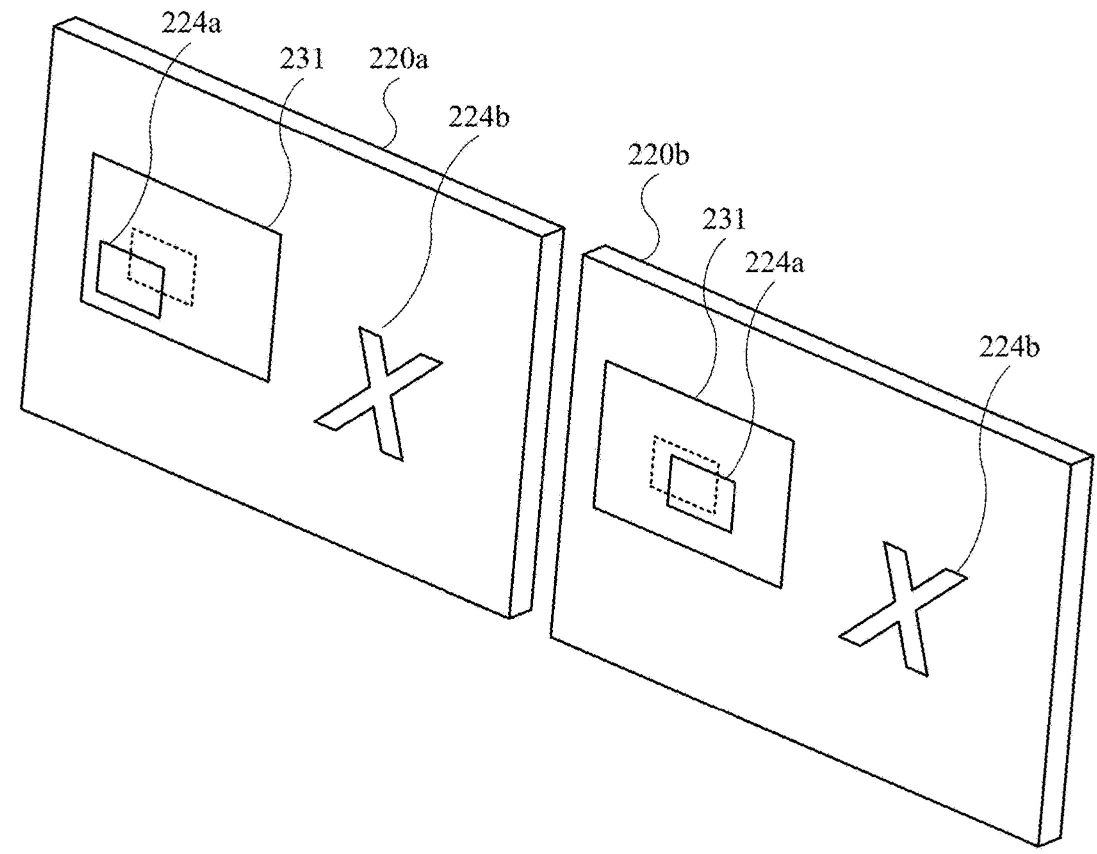
FIG. 7A and FIG. 7B illustrate a perspective view and a plan view, respectively, of an example of displays of an electronic device presenting virtual content, showing a virtual magnifier further magnifying the first virtual object based on one or more aspects of the second virtual object, in accordance with one or more implementations.

FIG. 7A illustrates the displays 220*a* and 220*b* moving the virtual object 224*a*. As shown, the displays 220*a* and 220*b* present the virtual object 224*a* further from each other. For comparative purposes, the virtual object 224*b* in the prior position (shown in FIG. 6A) as dotted lines to show the relative movement of the virtual object 224*b*. The relative movement of the virtual object 224*b* may also include relative movement with respect to the virtual object 224*a*.

Figure 7B:
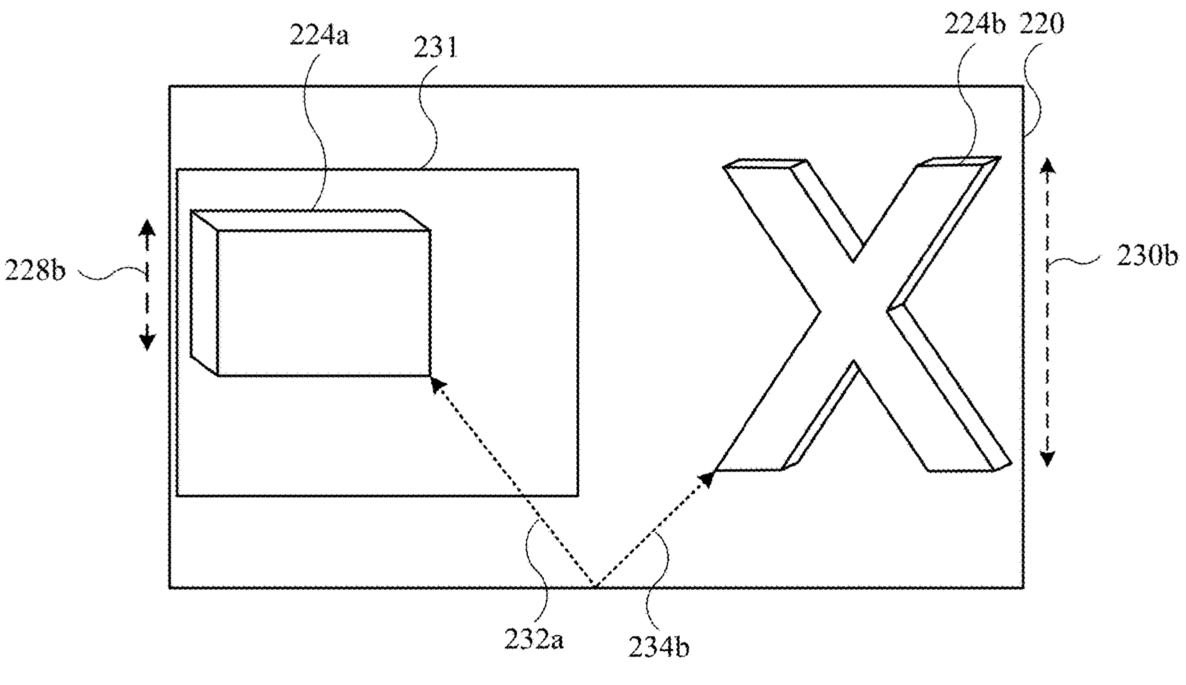

FIG. 7B illustrates the size of the virtual object 224*a* increasing due to the movement of the virtual object 224*a* (shown in FIG. 7A). As shown, the virtual object 224*a* increases to a dimension 228*b*, representing the magnified dimension, which is greater than the dimension 228*a* (e.g., the original dimension shown in FIG. 6B). The representation 220 may present the dimensional increase subsequent to passing of the predetermined time in which the virtual object 224*a* was adjusted to the virtual depth 232*b* (shown in FIG. 6B). The increase of the virtual object 224*a* may be based on the same magnification factor as used to increase the size of the virtual object 224*a* (shown in FIG. 3). Accordingly, the virtual object 224*a* may again increase by a factor of 2×. Additionally, the virtual object 224*a*, when increased to the dimension 228*b*, may again be positioned at the virtual depth 232*a*. Thus, the magnification of the virtual object 224*a* may be animated to again restore respective proportion in the virtual depths of the virtual objects 224*a* and 224*b*. In one or more implementations, the resultant virtual depths may differ than from what is shown in FIG. 7B. However, the respective virtual depths, pre- and post-magnification, of the virtual objects 224*a* and 224*b* may nonetheless be maintained. The dimension 230*b* (e.g., increased dimension) of the virtual object 224*b* is shown in FIG. 7B for comparative purposes, and the virtual object 224*b* may reduce back to its original size (e.g., shown in FIG. 2B). Accordingly, FIGS. 6A-6B illustrate a similar effect for the virtual object 224*a* as what is shown in FIGS. 4A-5B for the virtual object 224*b*.

FIG. 8A, FIG. 8B, FIG. 9 and FIG. 10 illustrate techniques that may be incorporated, in addition to the aforementioned techniques.

Figure 8A:
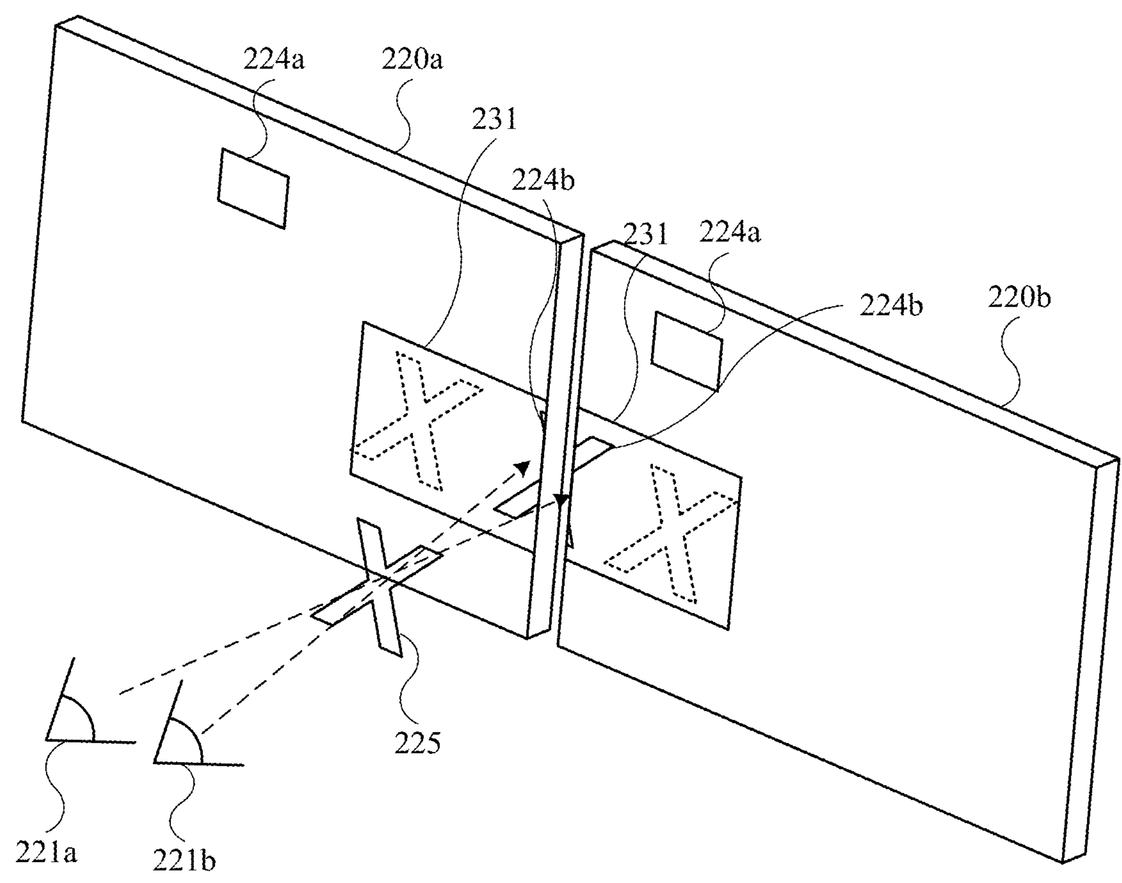
FIGS. 8A and 8B illustrate a perspective view and a plan view, respectively, showing issues related to vergence, in accordance with one or more implementations.

Referring to FIG. 8A, the displays 220*a* and 220*b* present the virtual objects 224*a* and 224*b*, with the virtual magnifier 231 positioned over the virtual object 224*b*. The prior example provided a method to maintain the same relative virtual depths and relative dimensions as compared to the virtual object 224*a*. However, in some instances, to maintain the same relative virtual depths and relative dimensions, over-magnification may occur resulting in vergence issues. For example, a similar magnification technique is shown in FIG. 8A. The dotted lines represent a respective prior position of the virtual object 224*b* presented on the displays 220*a* and 220*b*. Based on the resultant magnification, the virtual object 224*b* is no longer perceived by the left eye 221*a* and the right eye 221*b* at a fixed depth (e.g., on the displays 220*a* and 220*b*). For example, a virtual representation 225 (of the virtual object 224*b*) is magnified such that the left eye 221*a* and the right eye 221*b* perceive the virtual object 224*b* as being closer to the user that what is presented on the displays 220*a* and 220*b*, i.e., a mismatch between distances.

Figure 8B:
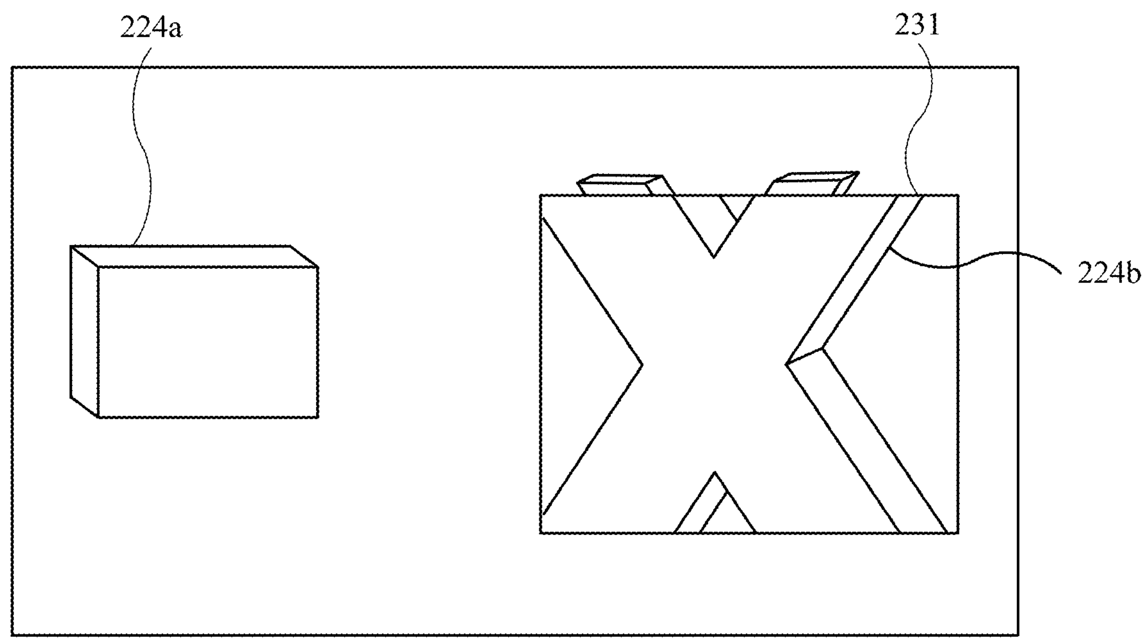

FIG. 8B illustrates a vergence response to the virtual object 224*b* based upon the magnification in FIG. 8A. As shown, the virtual object 224*b* may appear too close to the user such that the user may not see the virtual object 224*b* within the virtual magnifier 231. Additionally, other issues such as blurriness or double vision may occur. In order to mitigate or prevent this issue of over magnification, the magnification of the virtual object 224*b* may be limited to a threshold magnification despite the virtual magnifier 231 being set to provide a predetermined magnification factor. For example, a modification to magnification of the virtual object 224*b* may determine (e.g., by the compositing engine 127 shown in FIG. 1) whether an updated magnification, based on the virtual magnifier 231, exceeds the threshold magnification. When a determination is made that the updated magnification will exceed the threshold magnification, the magnification of the virtual object 224*b* may be limited to a magnification less than that as would be provided by the virtual magnifier 231. As a non-limiting example, the magnification of the virtual object 224*b* may be limited to the area of the virtual magnifier 231. By limiting the magnification of the virtual object 224*b*, the virtual depths and/or respective dimensions between the virtual objects 224*a* and 224*b* may not be maintained. Beneficially, however, the virtual object 224*b*, modified to a reduced dimension, may remain below the threshold magnification, thus avoid vergence issues.

Figure 9:
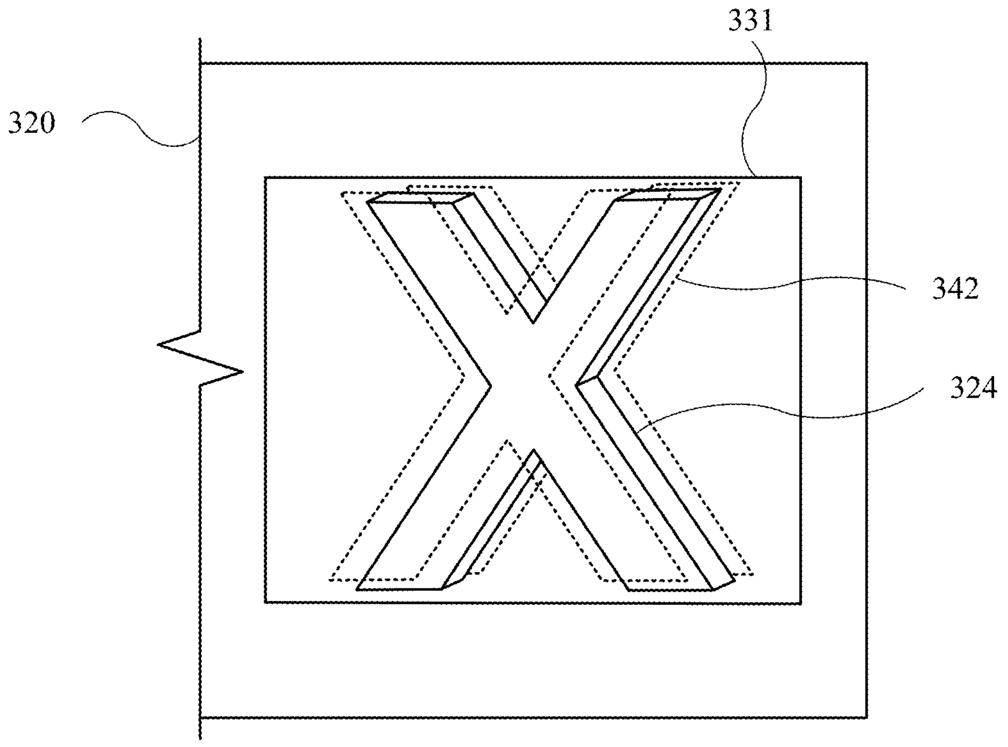
FIG. 9 illustrates a plan view of a display presenting virtual content, showing an adjustment to the magnification of a virtual object by blurring the virtual object, in accordance with one or more implementations.

Referring to FIG. 9, a representation 320 of two displays in a stereoscopic display mode presents a virtual object 324, with a virtual magnifier 331 positioned over the virtual object 324. Based on the virtual magnifier 331, the virtual object 324 may be magnified. For example, in order to maintain the disparity in virtual depths between the virtual object 324 and another virtual object (not shown in FIG. 9), the magnification of the virtual object 324 may be performed by simulating a decrease in virtual depth of the virtual object 324 or a dimensional increase of the virtual object 324. Due in part to the magnification increasing the size of the virtual object 324, the virtual object 324 may be too close to the user, thus causing similar vergence issues as discussed herein. However, the virtual object 324 may be modified. For example, a blurred alteration 342 (shown as dotted lines) may be generated and may represent a blurred image of the virtual object 324. Moreover, the blurred alteration 342 may be superimposed over the virtual object 324. The blurred alteration 342 of the virtual object 324 may provide an indication to a user that the virtual object 324 is being presented too closely to the user and corrective action (e.g., moving the virtual magnifier 331 off of the virtual object 324) may be recommended.

Figure 10:
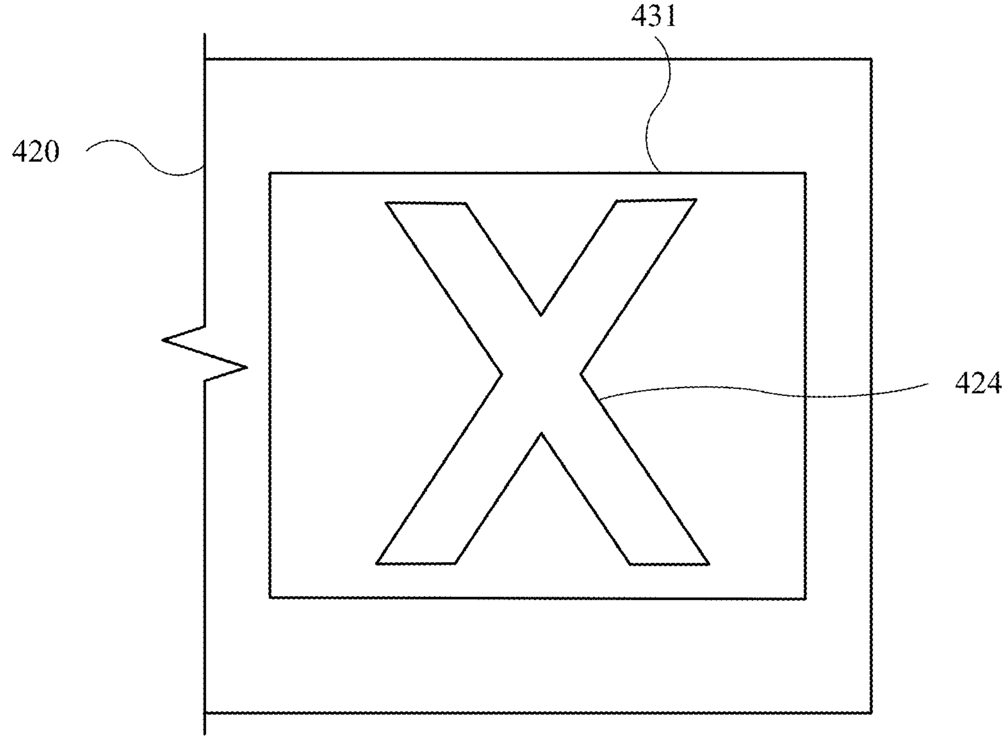
FIG. 10 illustrates a plan view of a display presenting virtual content, showing an adjustment to the magnification of a virtual object by modifying the virtual object from a three-dimensional virtual object to a two-dimensional virtual object, in accordance with one or more implementations.

Referring to FIG. 10, a representation 420 of two displays in a stereoscopic display mode presents a virtual object 424, with a virtual magnifier 431 positioned over the virtual object 424. Based on the virtual magnifier 431, the virtual object 424 may be magnified. For example, in order to maintain the respective virtual depths between the virtual object 424 and another virtual object (not shown in FIG. 10), the magnification of the virtual object 424 may be performed by simulating a decrease in virtual depth of the virtual object 424 or a dimensional increase of the virtual object 424. However, when the virtual object 424 is presented too closely, similar vergence issues discussed herein may also occur. To mitigate or prevent such issues, the two displays in a stereoscopic display mode may present the virtual object 424, normally a three-dimensional virtual object (e.g., shown in FIG. 7B), may be modified and presented as a two-dimensions (e.g., flat) object, as shown in the representation 420.

Figure 11:
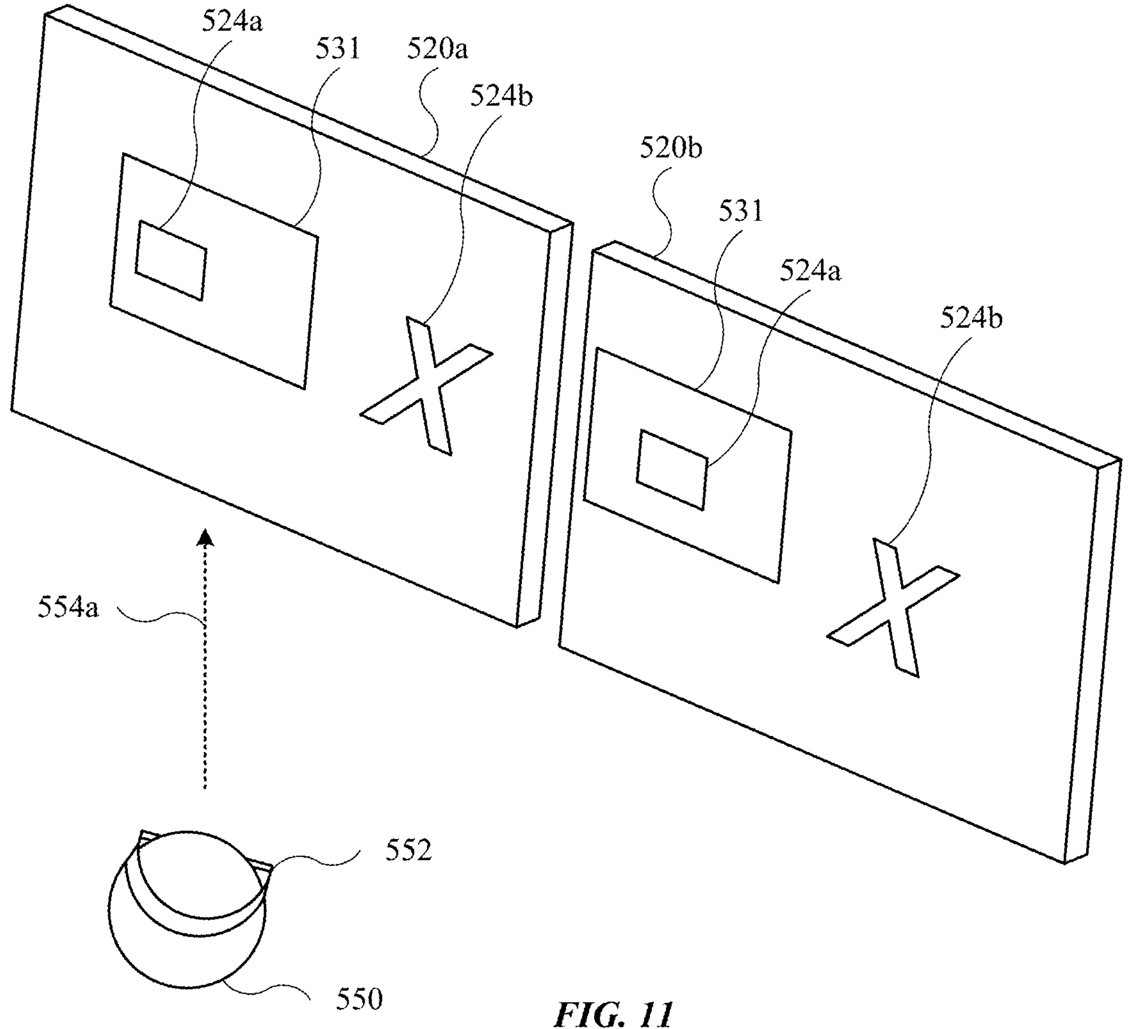
FIG. 11 illustrates an example of a user of an electronic device with a display that is presenting virtual content, further showing a virtual magnifier over a first virtual object, in accordance with one or more implementations.
Figure 12:
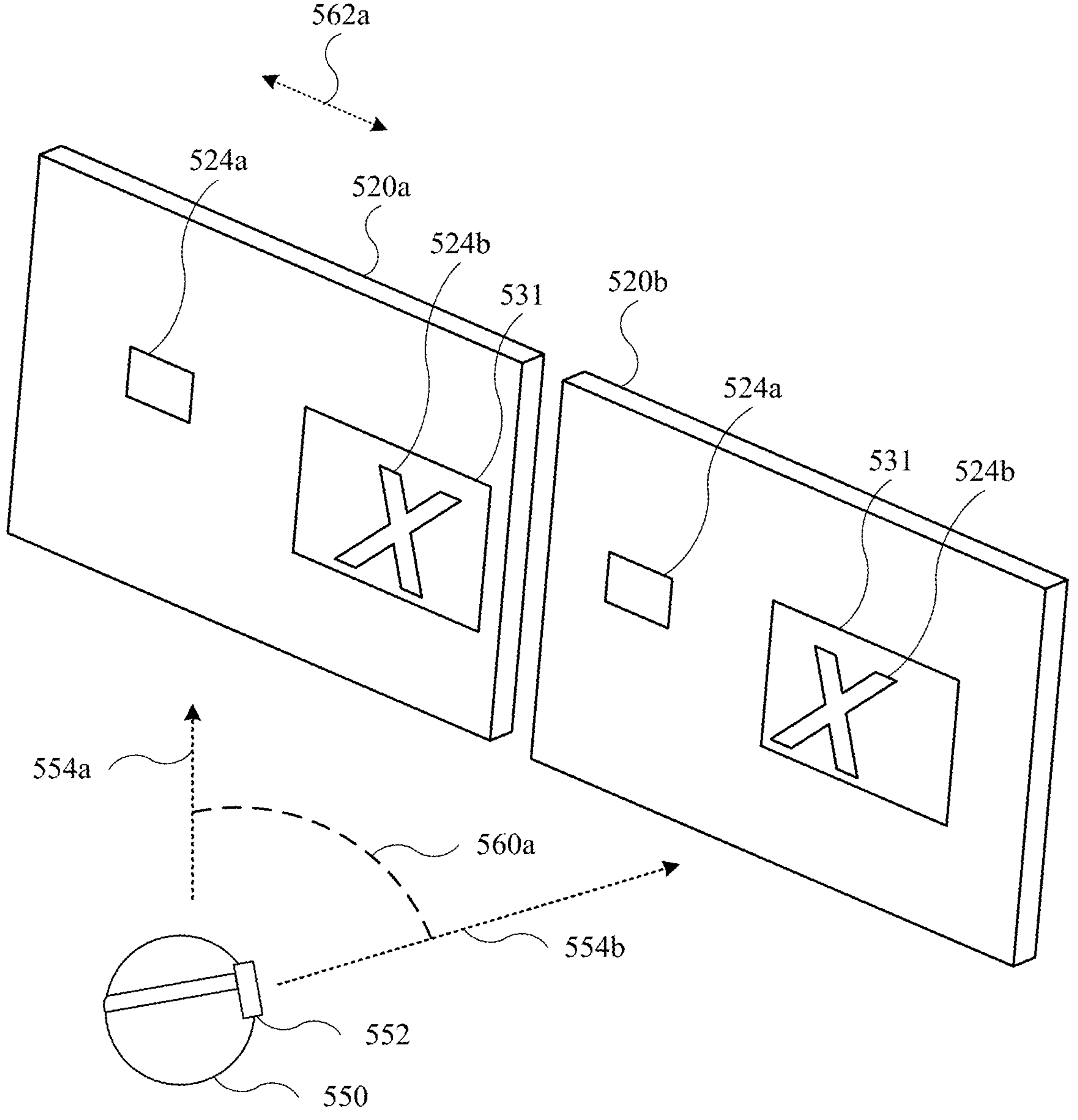
FIG. 12 and FIG. 13 illustrate examples of a user of an electronic device with a display that is presenting virtual content, further showing the virtual magnifier moving from the first virtual object to a second virtual object, in accordance with one or more implementations.
Figure 13:
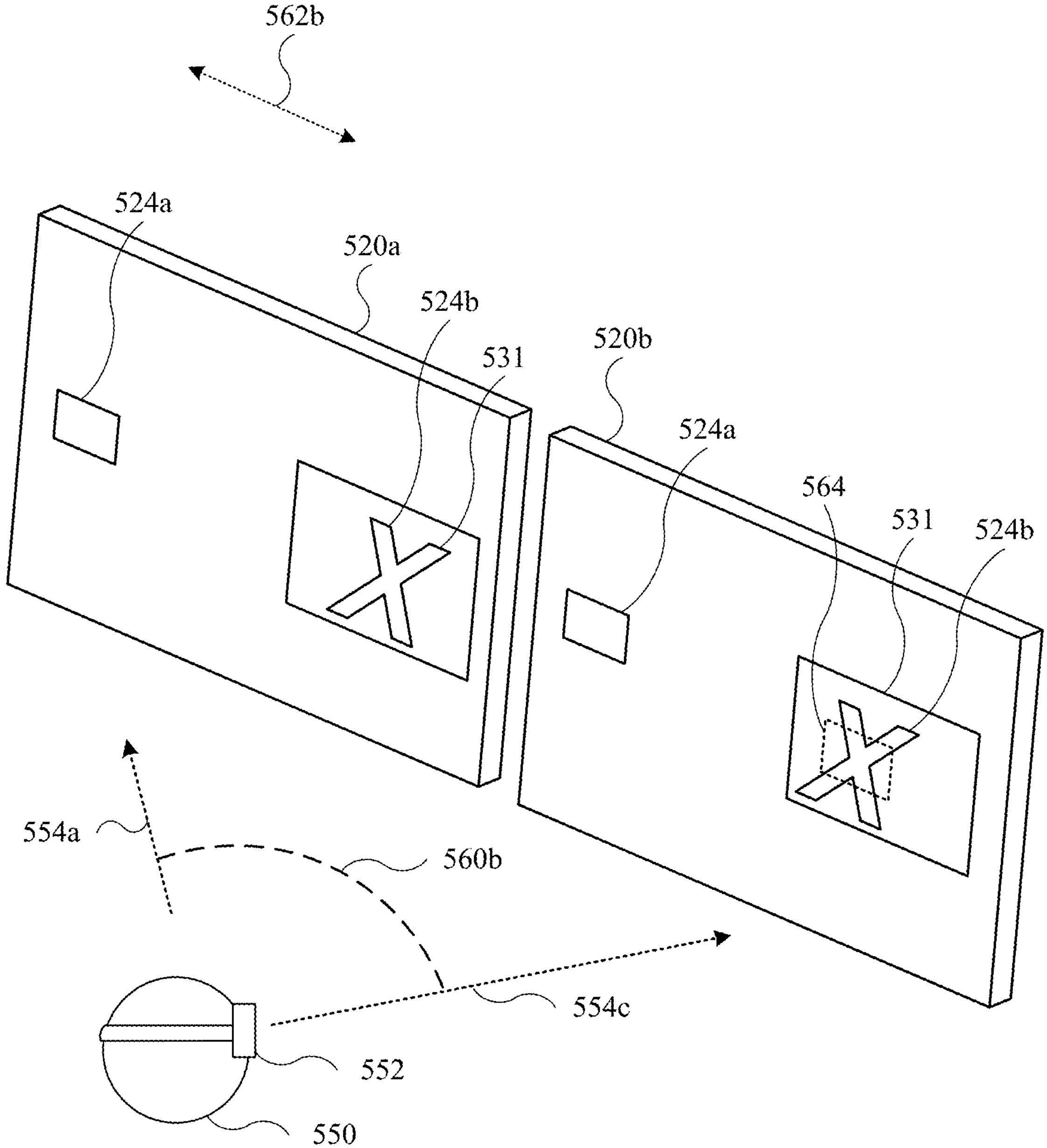

FIG. 11, FIG. 12, and FIG. 13 illustrate additional modifications for magnification applications by a virtual magnifier. One or more of the modifications shown and described in FIG. 11, FIG. 12, and FIG. 13 may be applied to the prior magnification applications.

FIG. 11 illustrates a user 550 wearing an MR device 552. A display 520*a* and a display 520*b* is shown, with a virtual object 524*a* and a virtual object 524*b* presented at the display 520*a*. For purposes of illustration, the displays 520*a* and 520*b* are enlarged to show the virtual objects 524*a* and 524*b*. However, the displays 520*a* and 520*b* may represent integrated displays in the MR device 552, with the MR device 552 positioned on the user 550 to present the displays 520*a* and 520*b* to the eyes of the user 550. A virtual magnifier 531 is positioned over the virtual object 524*a*, thus altering (e.g., magnifying) the virtual object 524*a*. Further, the MR device 552 is shown in an initial position based on the MR device 552 being moved by the user 550, thus allowing the user 550 view the virtual object 524*a* through the virtual magnifier 531. An arrow 554*a* represents an initial gaze of the user 550.

FIG. 12 illustrates the virtual magnifier 531 moved from the virtual object 524*a* to the virtual object 524*b*. As shown, the MR device 552 is moved by the user 550 to view the virtual object 524*b*. An arrow 554*b* represents a subsequent gaze of the user 550.

The modification of the virtual object 524*b* may be performed in any manner previously described, such as by adjusting virtual depths or dimensions of the virtual object 524*b*. However, additional modifications may be performed on the virtual object 524*b*. For example, an angle 560*a* may represent a change in position (e.g., angular shift) of the MR device 552 by the user 550 from an initial position (shown in FIG. 11) to a subsequent position shown in FIG. 12. A dimension 562*a* represents a distance between the virtual objects 524*a* and 524*b* (on each of displays 520*a* and 520*b*), with the angle 560*a* being based upon the dimension 562*a*. Further, an arrow 554*b* represents a subsequent gaze of the user 550. The angle 560*a* may also represent a shift between the initial gaze (e.g., represented by the arrow 554*a*) and the subsequent gaze (e.g., represented by the arrow 554*b*). In order to determine the angle 560*a* and the result change in position, the MR device 552 may include an orientation sensor (e.g., one or more orientation sensors 110 shown in FIG. 1) to determine an initial and subsequent position of the MR device 552, and use the initial and subsequent positions to determine the angle 560*a*. Alternatively, the MR device 552 may include one or more eye tracking sensors (e.g., eye sensor 122 shown in FIG. 1) to determine the change in the gaze of the user 550, and use the initial and subsequent gaze positions to determine the angle 560*a*.

When the angle 560*a* is below a predetermined angle, or threshold angle, the movement of the MR device 552 by the user 550 may be considered minimal. The predetermined angle may be compared with a change threshold, which represents a maximum allowable angle before additional modifications and/or adjustments to the magnification are applied. As shown in FIG. 12, the change threshold is not satisfied (based on the predetermined angle being below the change threshold) and the displays 520*a* and 520*b*, when updating to magnify the virtual object 524*b*, may reliably present the magnification of the virtual object 524*b*. Put another way, issues due to refresh updates, calculations applied to the magnification, and/or jitter are not sufficiently present when the virtual magnifier 531 moves from the virtual object 524*a* to the virtual object 524*b* and magnifies the virtual object 524*b*. Accordingly, the displays 520*a* and 520*b* may be updated to magnify the virtual object 524*b* without additional changes or modifications.

FIG. 13 illustrates the virtual magnifier 531 moved from the virtual object 524*a* to the virtual object 524*b*. As shown, the MR device 552 is moved by the user 550 to view the virtual object 524*b*. An arrow 554*c* represents a subsequent gaze of the user 550. In the example shown in FIG. 13, the virtual objects 524*a* and 524*b* presented on the displays 520*a* and 520*b* are separated by a dimension 562*b*, representing a distance between the virtual objects 524*a* and 524*b* (on each of displays 520*a* and 520*b*). The dimension 562*b* may be greater than the dimension 562*a* (shown in FIG. 12). Also, an angle 560*b* may represent a change in position (e.g., angular shift) of the MR device 552 by the user 550 from an initial position (shown in FIG. 11) to a subsequent position shown in FIG. 13. The angle 560*b* may also represent a change in between an initial gaze (e.g., represented by the arrow 554*a*) and a subsequent gaze (represented by an arrow 554*c*) is shown.

As shown, the angle 560*b* is greater than the angle 560*a* (shown in FIG. 12). Further, the angle 560*b* is at or above a predetermined angle, or threshold angle, and the movement of the MR device 552 by the user 550 may be considered consequential. As a result, the displays 520*a* and 520*b*, when updating to magnify the virtual object 524*b*, may not reliably present the magnification of the virtual object 524*b*. Put another way, issues due to refresh updates, calculations applied to the magnification, and/or jitter may be present when the virtual magnifier 531 moves from the virtual object 524*a* to the virtual object 524*b* and magnifies the virtual object 524*b*. As a result, the change threshold is satisfied (based on the predetermined angle being at or above the change threshold) and further modifications the virtual object 524*b* may be required. For example, an object 564 (shown as dotted lines) represents the virtual object 524*a* blended (e.g., merged, combined) with the virtual object 524*b* to form a blended image presented at the display 520*b*, with the blended image corresponding to a combined image of the virtual objects 524*a* and 524*b*. This may be conducted by a compositor (e.g., compositing engine 127 shown in FIG. 1). The blended image may use a reprojection frame that uses one or more previously rendered frames used in conjunction with updated motioned-based information from a sensor to extrapolate and predict a new frame.

The degree to which the object 564 is blended with the virtual object 524*b* may be based in part on an angle (e.g., the angle 560*b*) between initial and subsequent position of the MR device 552 or between initial and subsequent gaze positions of the user 550. For example, a blend value may be used as an input to one or more stabilization algorithms used to correct the magnification of the virtual object 524*b*. The blend value may be a function of the angle. In this regard, the blend value may be proportional to the angle, and the blend value increases or decreases in proportion to an increased or decreased angle, respectively. Beneficially, the additional modifications from the one or more stabilization algorithms may be applied to the prior magnification techniques described herein, thus increasing the likelihood of presenting the virtual object 524*b* at the displays 520*a* and 520*b* in a desired manner.

Figure 14:
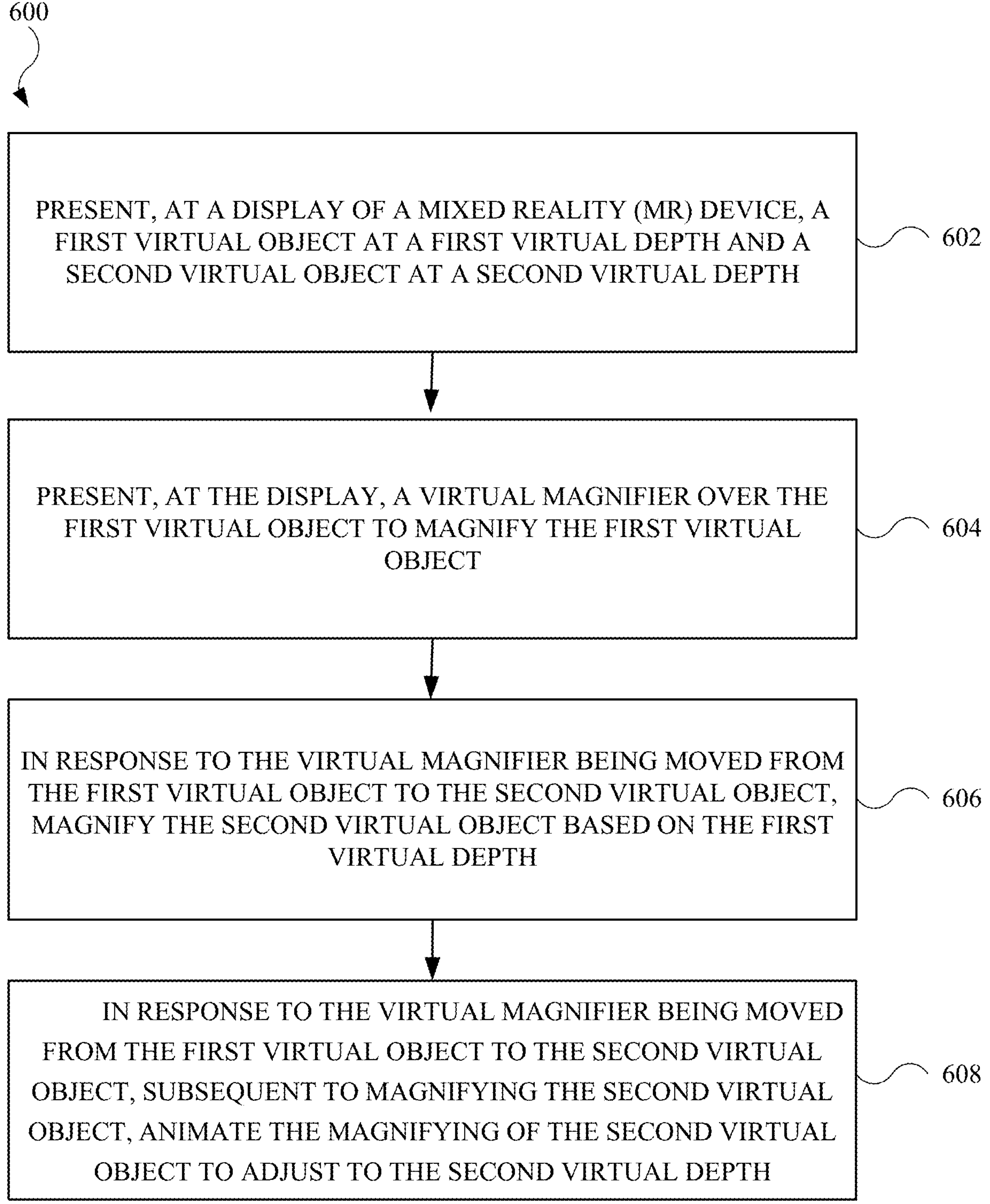
FIG. 14 illustrates a flowchart showing a method for managing virtual content that is magnified, in accordance with one or more implementations.

FIG. 14 illustrates a flowchart 600 showing a method for managing virtual content that is magnified. The steps of the flowchart 600 may be conducted by one or more electronic devices described herein, such as an MR device, as a non-limiting example.

In step 602, a first virtual object at a first virtual depth and a second virtual object at a second virtual depth are each presented at a display of an MR device. The first and second virtual object may be presented at different dimension or sizes. Further, the first and second virtual depths may be different.

In step 604, a virtual magnifier is presented, at the display, over the first virtual object to magnify the first virtual object. The virtual magnifier may mimic at least some functions of a magnifier, thus altering (e.g., magnifying) the first and second virtual objects when placed over the first and second virtual objects.

In step 606, in response to the virtual magnifier being moved from the first virtual object to the second virtual object, the second virtual object is magnified based on the first virtual depth. For example, the second virtual object, when magnified by the virtual magnifier, may transition to the same virtual depth as that of the first virtual object. Thus, the first and second virtual depths may be equal or substantially equal. This may occur for a predetermined time.

In step 608, in response to the virtual magnifier being moved from the first virtual object to the second virtual object, subsequent to magnifying the second virtual object, the magnifying of the second virtual object is animated to adjust to the second virtual depth. For example, the second virtual object may be magnified so to place the second virtual object back at the second virtual depth. This may include for example, magnifying the second virtual object to increase the size of the second virtual object. As a result, the second virtual object, when magnified, may be in proportion to the first virtual object, when magnified, in terms of size and virtual depth, with the proportion being the same proportion prior to magnification of the first and second virtual objects.

Figure 15:
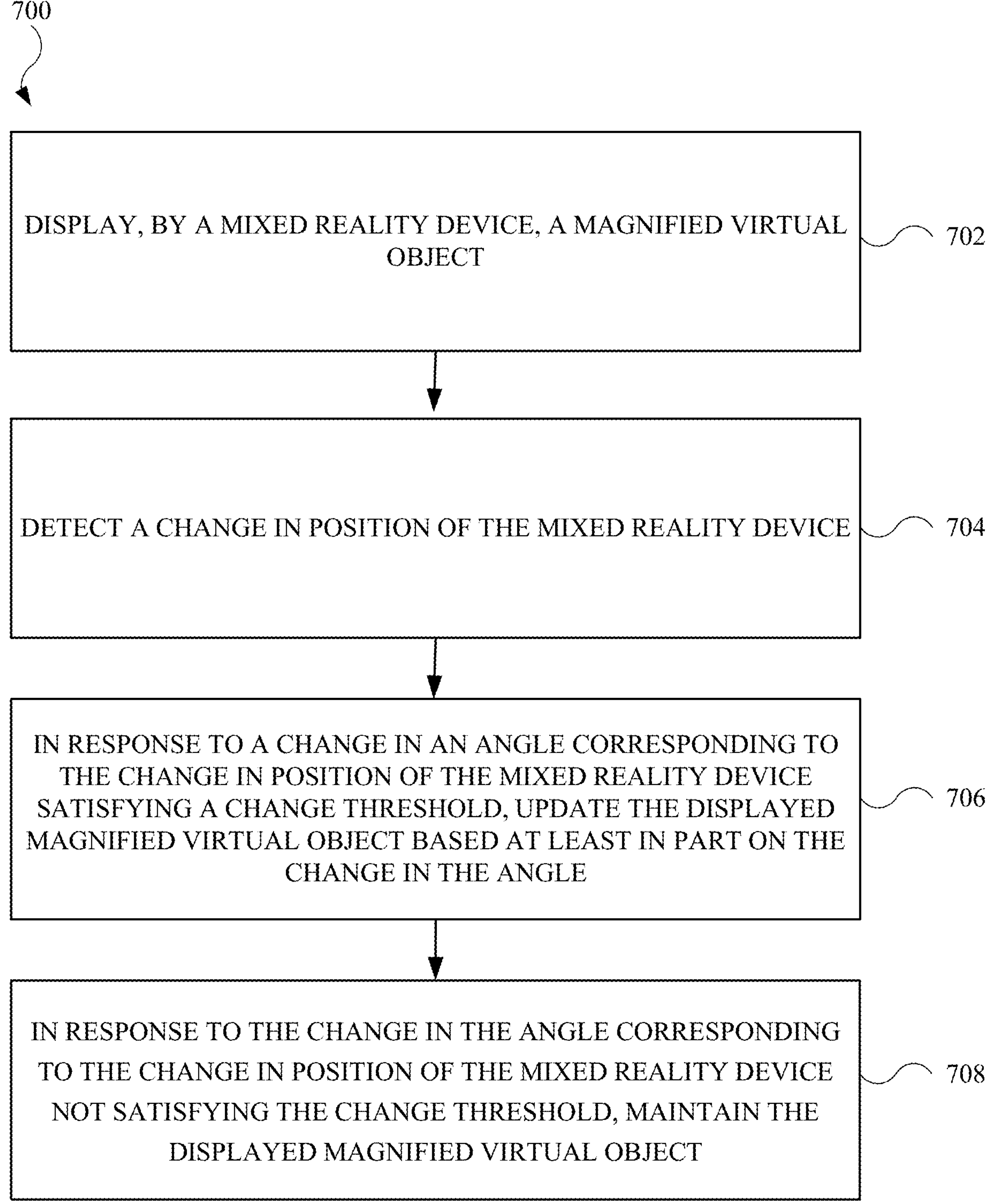
FIG. 15 illustrates a flowchart showing an additional method for managing virtual content that is magnified, in accordance with one or more implementations.

FIG. 15 illustrates a flowchart 700 showing a method for managing virtual content that is magnified. The steps of the flowchart 700 may be conducted by one or more electronic devices described herein, such as an MR device, as a non-limiting example. Alternatively, or in combination, the steps of the flowchart 700 may be conducted by computer-readable instructions stored on a non-transitory computer-readable medium.

In step 702, a mixed reality (MR) device displays a magnified virtual object. For example, a display of the MR device may render, using a rendering engine, multiple virtual objects as well as a virtual magnifier over at least one of the virtual objects. The virtual magnifier may appear to magnify, using a compositor, the virtual object(s).

In step 704, a change in position of the mixed reality device is detected. For example, MR device may be moved, thus causing an update to the display. This may include providing an update and/or adding a new virtual object.

In step 706, in response to a change in an angle corresponding to the change in position of the mixed reality device satisfying a change threshold, the displayed magnified virtual object is updated based at least in part on the change in the angle. In one or more implementations, the change threshold is based a maximum allowable angle before additional modifications to the magnification are used. The update may include blending or combining a prior and a current magnified virtual object (e.g., via a reprojection frame) based on a blend value. The blending/combining may be performed in addition to other magnification applications, such as magnification of a virtual object based upon characteristics (e.g., virtual depth) of another virtual object.

In step 708, in response to the change in the angle corresponding to the change in position of the mixed reality device not satisfying the change threshold, the displayed magnified virtual object is maintained. As a result of the change threshold not being satisfied, the blending/combining of images is not required.

Various processes defined herein consider the option of obtaining and utilizing a user's personal information. For example, such personal information may be utilized in order to provide a video view of a physical setting. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system comprising:

a memory; and a processor configured to:

identify, at a display of a mixed reality (MR) device, a first virtual object and a second virtual object;

present, at the display, a virtual magnifier over the first virtual object;

magnify, based on the virtual magnifier, the first virtual object; and in response to the virtual magnifier being moved from the first virtual object to being positioned over the second virtual object to magnify the second virtual object:

maintain the second virtual object at a first virtual depth; and subsequent to maintaining the second virtual object at the first virtual depth, transition the magnified second virtual object based on the magnified first virtual object from a first virtual depth to a second virtual depth different from the first virtual depth, and present, at the second virtual depth, the magnified second virtual object at the display.

2. The system of claim 1, wherein the processor is further configured to:

determine whether the magnified second virtual object exceeds a threshold magnification; and in response to determining the magnified second virtual object exceeds the threshold magnification, reduce a dimension of the magnified second virtual object.

3. The system of claim 1, wherein the processor is further configured to transition, based on the virtual magnifier, the magnified second virtual object based on a virtual depth of the magnified first virtual object.

4. The system of claim 3, wherein the second virtual depth of the magnified second virtual object is equal to the second virtual depth associated with the second virtual object.

5. The system of claim 1, wherein the magnified second virtual object is presented at the display at a second virtual depth less than the first virtual depth.

6. The system of claim 1, wherein the processor is further configured to transition the magnified second virtual object to the second virtual depth to maintain a respective virtual depth between the first virtual object and the second virtual object.

7. The system of claim 1, wherein the processor is further configured to maintain the second virtual object at the first virtual depth for a predetermined time.

8. A method, comprising:

presenting, at a display of a mixed reality (MR) device, a first virtual object at a first virtual depth and a second virtual object at a second virtual depth;

presenting, at the display, a virtual magnifier over the first virtual object to magnify the first virtual object; and in response to the virtual magnifier being moved from the first virtual object to the second virtual object:

magnifying the second virtual object based on the first virtual depth; and subsequent to magnifying the second virtual object, animating the magnifying of the second virtual object to adjust to the second virtual depth.

9. The method of claim 8, wherein magnifying the second virtual object based on the first virtual depth comprises animating the second virtual object to appear at the first virtual depth.

10. The method of claim 8, wherein animating the magnifying of the second virtual object to adjust to the second virtual depth comprises magnifying the second virtual object to appear at the second virtual depth.

11. The method of claim 10, wherein magnifying the second virtual object to appear at the second virtual depth comprises animating the second virtual object to increase a size of the second virtual object.

12. The method of claim 8, wherein the second virtual depth is different than the first virtual depth.

13. The method of claim 12, wherein the first virtual depth is less than the second virtual depth.

14. The method of claim 12, wherein the second virtual depth is less than the first virtual depth.

15. The method of claim 8, further comprising:

determining whether the second virtual object exceeds a threshold magnification;

in response to determining the second virtual object does not exceed the threshold magnification, increasing a size of the second virtual object based on a first magnification; and in response to determining the second virtual object, magnified to the first magnification, exceeds the threshold magnification, increasing the size of the second virtual object based on a second magnification less than the first magnification.

16. A non-transitory computer-readable medium comprising:

computer-readable instructions that, when executed by a processor, cause the processor to perform one or more operations comprising:

displaying, by a mixed reality device, a magnified virtual object;

detecting a change in position of the mixed reality device;

in response to a change in an angle corresponding to the change in position of the mixed reality device satisfying a change threshold, updating the displayed magnified virtual object based at least in part on the change in the angle; and in response to the change in the angle corresponding to the change in position of the mixed reality device not satisfying the change threshold, maintaining the displayed magnified virtual object.

17. The non-transitory computer-readable medium of claim 16, wherein the one or more operations further comprise:

determining a first position of the mixed reality device;

determining a second position of the mixed reality device; and determining the angle based on the first position and the second position.

18. The non-transitory computer-readable medium of claim 17, wherein:

updating the displayed magnified virtual object comprises applying a blend value used to generate a combined image based on the displayed magnified virtual object and the updated displayed magnified virtual object, and the updated displayed magnified virtual object comprises a reprojection frame.

19. The non-transitory computer-readable medium of claim 18, wherein the blend value is based on the determined angle.

20. The non-transitory computer-readable medium of claim 18, wherein the one or more operations further comprise:

comparing the determined angle with the change threshold; and in response to the determined angle being equal to or greater than the change threshold, magnifying the virtual object based on the blend value.

* * * * *